US011483174B1

(12) United States Patent
Eberhardt et al.

(10) Patent No.: US 11,483,174 B1
(45) Date of Patent: Oct. 25, 2022

(54) DEVICE FUNCTIONALITY CONTROL UTILIZING ACTIVITY PREDICTION

(71) Applicant: Amazon Technologies, Inc., Seattle, WA (US)

(72) Inventors: Sven Eberhardt, Seattle, WA (US); Suhel Banerjee, Seattle, WA (US); Charles Edwin Ashton Brett, Seattle, WA (US); Akanksha Gupta, Seattle, WA (US); Jin Long Lee, Seattle, WA (US); Hongyang Wang, Seattle, WA (US); Maisie Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/364,311

(22) Filed: Jun. 30, 2021

(51) Int. Cl.
*H04L 12/28* (2006.01)

(52) U.S. Cl.
CPC ........ *H04L 12/2829* (2013.01); *H04L 12/282* (2013.01)

(58) Field of Classification Search
CPC .................... H04L 12/2829; H04L 12/282
See application file for complete search history.

(56) References Cited

U.S. PATENT DOCUMENTS

2020/0160860 A1\* 5/2020 Singh ................ H04W 4/48
2020/0342011 A1\* 10/2020 Miller ................ G06F 16/335

FOREIGN PATENT DOCUMENTS

CN 111207560 A \* 5/2020

\* cited by examiner

*Primary Examiner* — Tejal Gami
(74) *Attorney, Agent, or Firm* — Lee & Hayes, P.C.

(57) ABSTRACT

Systems and methods for device functionality control utilizing activity prediction are disclosed. For example, an activity model is utilized to identify activities associated with sensor data collected from connected devices within an environment. Target device usage data is then associated with the activities to determine probability values that the target device will be operated when the identified activities are detected. Commands may be generated and sent to the target device to perform a function when the identified activities are detected.

20 Claims, 12 Drawing Sheets

700 ⬇

Receive, from first devices and during period of time, first data indicating sounds made in space in which first devices are disposed, first devices being associated with second device configured to refrigerate items within second device
702

Generate, utilizing first data, second data indicating that sounds are associated with predefined user activity within space, predefined user activity being predefined to be associated with use of second device
704

Receive, from second device and during period of time, third data indicating that door of second device is opened
706

Generate, utilizing second data and third data, fourth data indicating first probability value that door of second device will be opened when predefined user activity is detected
708

Send, to second device and in response to detecting predefined user activity from acoustic events within space, first command configured to cause temperature control component of second device to delay cooling within second device
710

Receive, from first device and during period of time, first data representing sounds made in space in which first device is disposed
802

Generate, based at least in part on first data, second data indicating that sounds are associated with predefined user activity within space
804

Receive, from second device and during period of time, third data indicating that door of second device is opened
806

Generate, based at least in part on second data and third data, fourth data indicating first probability value that door of second device will be opened when predefined user activity is detected
808

Send, to second device and in response to detecting predefined user activity from acoustic events within space, first command configured to cause action associated with temperature control component of second device to be performed
810

FIG. 8

DEVICE FUNCTIONALITY CONTROL UTILIZING ACTIVITY PREDICTION

BACKGROUND

Internet-of-things devices have become more common in homes and other environments. Multi-functional devices have also become more common. Described herein are improvements in technology and solutions to technical problems that can be used to, among other things, enhance use of multi-functional devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of an example process for device functionality control utilizing activity prediction.

FIG. 8 illustrates a flow diagram of another example process for device functionality control utilizing activity prediction.

DETAILED DESCRIPTION

Figure 1:
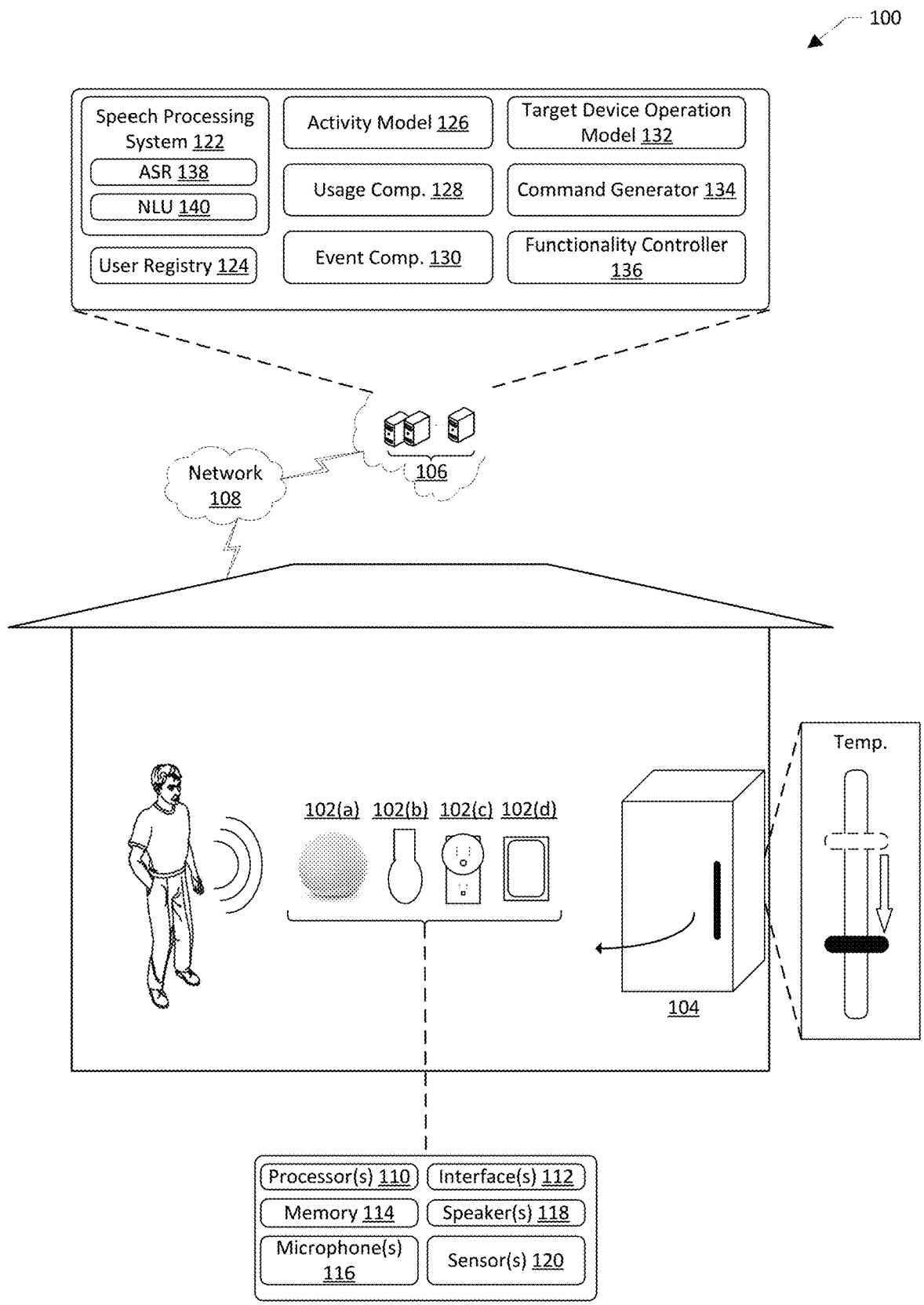
FIG. 1 illustrates a schematic diagram of an example environment for device functionality control utilizing activity prediction.

Systems and methods for device functionality control utilizing activity prediction are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, a "target device" may include an electronic device that performs, for example, multiple functionalities and is configured to at least receive a signal from one or more devices to cause the target device to perform one or more of the functionalities. By way of example, a target device may be a "smart" refrigerator that has a cooling component for cooling a refrigerator portion of the target device, another cooling component for cooling a freezer portion of the target device, and an ice maker for making ice. Also as used herein, a "connected device" may include an electronic device other than the target device that is configured to generate data associated with an environment in which the target device is situated and to relay that data to one or more other devices and/or systems.

Generally, a target device may be utilized over time differently by different users. For example, take a refrigerator target device that also as a freezer component and an ice maker. The target device maintains a certain temperature inside the refrigerator portion of the target device, maintains another, colder temperature inside the freezer component, and makes ice that is stored, for example, in the freezer component. When a user opens the refrigerator door, heat from outside the target device enters the refrigerator and cold air from inside the target device exits the refrigerator, which can cause the internal temperature of the refrigerator to rise. The target device may then cause a cooling component to turn on to once again cool down the temperature in the refrigerator to the desired temperature. A similar process may occur when the user opens the freezer door. Additional factors may also contribute to changing temperatures inside the target device, such as when warm and/or hot food is placed in the target device, when the exterior temperature of the target device changes, when a user uses a large amount of ice, etc. By so doing, the cooling components and/or ice making components of the target device turn on whenever the temperature inside the target device rises above certain target temperatures. This technique may lead to cooling units being enabled frequently, which may lead to wasted energy. For example, when a refrigerator door is opened frequently within a small period of time, the cooling unit may be turned on and may start cooling down the interior of the refrigerator multiple times. However, optimally, the cooling unit would remain disabled until use of the refrigerator door has ceased for at least a given period of time, then the cooling unit would be enabled only once following the last or near-last use of the refrigerator door. This would result in the cooling unit running for a shorter period of time. The same energy savings may be achieved for the freezer component and/or the ice making component. It should be understood that while the target device described herein is a refrigerator with a freezer and ice making component, this disclosure includes any target device and the refrigerator target device is utilized as a non-limiting example.

To more optimally control device functionality as described herein, activity predictions and modeling may be performed to determine when to cause the target device to perform certain functionalities. For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example, voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

An activity model may be configured to receive the sensor data and to utilize the sensor data to determine one or more activities that users within the environment are engaged in. These activities may include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen in combination with using a cooking skill or other type of app, for example. It should be understood that some or all of the sensor data described herein may be utilized to determine when a predefined activity is taking place within an environment, and the predefined activities may include those specifically used as examples herein and/or any other predefined activity that the activity model is trained to detect.

By way of example, weakly supervised machine learning can generate approximate labels for unlabeled data associated with acoustic event within a space. Such supervised machine learning may lead to a dramatic reduction in the cost of annotation, increased speed of model development, and improved privacy due to the minimal requirement for human review of customer data. For example, a user may write multiple labeling functions, which are functions that assign approximate labels to a subset of the data points. The relaxed accuracy and coverage requirements of labeling functions make them simple to write. An algorithm may be configured to fuse the labels to produce a single probabilistic label, which has high coverage. The fusion algorithm may provide more weight to labels which tend to agree with other labels, and less to those which disagree. After generating approximate labels, a supervised machine learning model may be trained to predict the labels, which may be described as historical activity modeling. Such as model may be configured to leverage subtle patterns in the data that simple human-defined labeling functions miss, and can make predictions for all data points. An example of such a model may be a dense neural network with two layers, as such models can leverage probabilistic labels and can be fine tuned on annotated data, such as by transfer learning.

By way of example, sounds from a space may be captured by one or more devices in the space that have a microphone and corresponding audio data may be generated. The audio data may be analyzed to label the sounds. For example, sounds associated with the filling of a pot with water, sounds associated with the click of a gas stovetop, sounds associated with the chopping of food, sounds associated with the sizzle of food items in a pan, etc. may be labeled with their corresponding activities, and probabilistic labeling may be performed utilizing the machine learning techniques described herein. The fusion algorithm may be utilized to fuse the multiple labels into a prediction of an activity of a user being performed in the space. In the example used here, the predefined user activity may be cooking and/or eating. This modeling may be utilized in additional to the device usage data described below to determine a probability that a device, such as a refrigerator, will be utilized when the sounds captured in the space indicate the predefined user activity is being performed.

Additionally, a usage component may be configured to generate and store target device usage data. For example, over a certain period of time, the target device may be utilized in one or more ways. Utilizing the refrigerator example from above, the door of the refrigerator may be opened and closed, the door of the freezer may be opened and closed, and the ice maker may enable and disable for making ice. When the target device is a "smart" device that is configured to detect operation of various components of the target device, the target device may detect usage as described herein and may generate the target device usage data corresponding to that usage. In examples where the target device is not configured to detect usage of its components and/or to generate target device usage data, one or more of the connected devices within the environment may be utilized for detecting usage and generating target device usage data. By way of example, one or more devices having microphones may be utilized to perform acoustic event detection to detect the sound of the target device door being opened and/or shut, and/or the sound of ice falling into a tray from an ice maker, for example. In other examples, the connected devices may include contact sensors that may be placed on the target device to detect the opening and closing of a door. Other sensor data than that specifically used above by way of example may be utilized as well to detect target device usage.

Additionally, an event component may be configured to determine when certain predefined events occur and/or are likely to occur that are associated with use of the target device. Keeping with the refrigerator example above, the event component may be configured to determine when a delivery of food is made and/or is expected to be made at the environment. The food delivery may be an indicator that the target device door will be operated at or near the time of the delivery. Other events may include the purchasing of items, the shipping of items, occurrence of certain scheduled events, certain times of day and/or days of the week, etc. Additionally, the event component may be configured to utilize purchasing data to determine specific food items that are delivered to an environment. For example, a given shipment of food may contain only nonperishable items that are not placed in a refrigerator or freezer. In this example, the event component may be configured to determine that the likelihood of the target device door being opened because of the food delivery is low. In another example, the given shipment of food may contain items that are typically placed in a refrigerator and/or freezer. In this example, the event component may be configured to determine that the likelihood of the target device door being opened because of the food delivery is high.

A target device operation model may be configured to receive activity data from the activity model, target device usage data from the usage component, and/or event data from the event component to determine one or more probability values that the target device will be operated and/or a number of times the target device will be operated during certain periods of time. To do so, the target device operation model may be trained to determine that the target device is operated when certain predefined activities are detected and/or when certain events occur. For example, the target device operation model may determine that when a cooking activity is detected, such as for a specific target device situated in a specific space and associated with specific account data, the refrigerator target device is operated on average, for example, 5 times. In this example, the target device operation model may determine that cooking activities, when detected, are associated with a greater amount of target device usage than at other times. Other examples of activities the target device operation model may determine are associated with greater target device usage may include, for example, when at least a threshold number of occupants are detected within a given space, such as within a kitchen space and/or a dining room space, when a given user is detected in the space, when presence is detected in a given space and/or within a given number of spaces, and/or when indicators of user entrance and/or exit from a space is detected. The target device operation model may be configured to utilize machine learning techniques, as described more fully below, to identify activities and/or activity factors that are more likely and/or less likely to be associated with target device usage.

In addition to the above, the target device operation model may be configured to determine which functionality of the target device is predicted to be performed when given predefined activities are detected. For example, the target device may be a multi-function device, such as the refrigerator target device described herein. In these examples, a first detected activity may be associated with performance of a first functionality of the target device while a second detected activity may be associated with performance of a second, different functionality of the target device. In these examples, the target device operation model may be configured to differentiate target device usage as between the multiple functionalities of the target device and to associate such usage with detected activities to determine which activities are associated with performance of the various device functionalities.

The target device operation model may be configured to utilize the generated probability values to determine when a command should be sent to the target device to cause a functionality of the target device to be performed and/or to cause the functionality to not be performed for a given period of time, for example. To do so, for example, the target device operation model may be configured to determine when the probability value satisfies a threshold probability value for generating the command. For example, the target device operation model may determine that the likelihood of the target device being operated when a given activity is detected is 80%, which may represent a high probability value and may result in the generation of a command to be sent to the target device. In certain examples, multiple activities may be detected during a given period of time and the collective occurrence of those activities may be associated with a given probability value of the target device being operated. This collective probability value may be utilized to determine when a command is to be sent to the target device. It should be understood that while thresholds are utilized by way of example to determine when a given probability value is sufficient for taking action, any other methodology for determining the sufficiency of a likelihood that the target device will be operated may be utilized and is disclosed herein.

In addition to the above, the results from the target device operation model may be utilized to determine that specific sounds captured from the space indicate imminent use of the target device. For example, as outlined above, the sounds may be labeled as indicating one or more likely activities. In addition to a cooking activity as used throughout as an example, additional related or otherwise tangential activities may be detected. For example, when the sounds from the space indicate that dishes are being cleaned, such as from the running of water, scrubbing sounds, etc., the target device operation model may be trained to determine that the refrigerator door will be opened within the next few minutes, such as to place leftovers in the refrigerator. Since leftovers are typically warm or otherwise not cold, a command may be sent to the refrigerator to expedite cooling of the refrigerator and/or to adjust the temperature in preparation for receiving the warm food.

A command generator may be configured to receive an indication that performance of a functionality of the target device should occur based at least in part on the probability value determinations described above. The command generator may generate a command configured to cause the functionality to be performed. In examples, the command, when received at the target device, may cause the target device to perform the functionality. Utilizing the refrigerator examples above, the command may be to cause a cooling unit of the refrigerator and/or freezer to enable and/or to cause the ice making component to make ice. In other examples, the command may cause the target device to refrain from performing the functionality and/or to perform the functionality at a later time and/or to disable operation of a component of the target device. For example, the command may cause a cooling component of the target device to stop cooling, to cause a cooling component not to enable for a given period of time when the door is opened, and/or to cause the cooling component to enable after 15 minutes, for example, from when the command is received.

A functionality controller may be configured to inform the generation of the command and/or to effectuate the command. For example, the functionality controller may indicate the functionalities of the target device and may be utilized to determine the type of command to be generated and sent to the target device. The functionality controller may also be utilized to receive the command and to effectuate the command to cause the target device to perform an action associated with the command. In certain examples, the functionality controller may be a component of a system that differs from the target device. In other examples, the functionality controller may be a component of the target device itself.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for device functionality control utilizing activity prediction. The system 100 may include, for example, one or more connected devices 102(a)-(d)102(a)-(d) and a target device 104. In certain examples, the devices 102(a)-(d)102(a)-(d), 104 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102(a)-(d)102(a)-(d), 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102(a)-(d)102(a)-(d), 104 may be configured to send data to and/or receive data from a system 106, such as via a network 108. It should be understood that where operations are described herein as being performed by the system 106, some or all of those operations may be performed by the devices 102(a)-(d)102(a)-(d), 104. It should also be understood that anytime the system 106 is referenced, that system may include any system and/or device, whether local to an environment of the devices 102(a)-(d)102(a)-(d), 104 or remote from that environment. Additionally, it should be understood that a given space and/or environment may include numerous devices 102(a)-(d)102(a)-(d), 104. It should also be understood that when a "space" or "environment" is used herein, those terms mean an area and not necessarily a given room, building, or other structure, unless otherwise specifically described as such.

The connected devices 102(a)-(d)102(a)-(d), and/or the target device 104, may include one or more components, such as, for example, one or more processors 110, one or more network interfaces 112, memory 114, one or more microphones 116, one or more speakers 118, and/or one or more sensors 120. The microphones 116 may be configured to capture audio, such as user utterances, and generate corresponding audio data. The speakers 118 may be configured to output audio, such as audio corresponding to audio data received from another device and/or the system 106. The devices 102(a)-(d)102(a)-(d) may also include displays that may be configured to display images corresponding to image data, such as image data received from the system 106 and/or one or more other devices. The sensors 120 may include any component configured to detect an environmental condition associated with the devices 102(a)-(d)102(a)-(d), 104 and/or the environment associated with the devices 102(a)-(d)102(a)-(d), 104. Some example sensors 120 may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 120, usage data and/or account data may be utilized to determine if an environmental condition is present.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 106 may include components such as, for example, a speech processing system 122, a user registry 124, an activity model 126, a usage component 128, an event component 130, a target device operation model 132, a command generator 134, and/or a functionality controller 136. It should be understood that while the components of the system 106 are depicted and/or described as separate from each other in FIG. 1, some or all of the components may be a part of the same system. The speech processing system 122 may include an automatic speech recognition component (ASR) 138 and/or a natural language understanding component (NLU) 140. Each of the components described herein with respect to the system 106 may be associated with their own systems, which collectively may be referred to herein as the system 106, and/or some or all of the components may be associated with a single system. Additionally, the system 106 may include one or more applications, which may be described as skills. "Skills," as described herein may be applications and/or may be a subset of an application. For example, a skill may receive data representing an intent. For example, an intent may be determined by the NLU component 140 and/or as determined from user input via a computing device. Skills may be configured to utilize the intent to output data for input to a text-to-speech component, a link or other resource locator for audio data, and/or a command to a device, such as the devices 102(*a*)-(*d*)102(*a*)-(*d*), 104. "Skills" may include applications running on devices, such as the devices 102(*a*)-(*d*)102(*a*)-(*d*), 104, and/or may include portions that interface with voice user interfaces of devices 102(*a*)-(*d*) 102(*a*)-(*d*), 104.

In instances where a voice-enabled device is utilized, skills may extend the functionality of devices 102(*a*)-(*d*)102(*a*)-(*d*), 104 that can be controlled by users utilizing a voice-user interface. In some examples, skills may be a type of application that may be useable in association with personal devices 104 and may have been developed specifically to work in connection with given personal devices 104. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the connected devices 102(*a*)-(*d*)102(*a*)-(*d*), the target devices 104, and the system 106 are described in detail below. In examples, some or each of the components of the system 106 may include their own processor(s), network interface(s), and/or memory. As such, by way of example, the speech processing system 122 may include and/or be associated with processor(s), network interface(s), and/or memory. The other components of the system 106, such as the target device operation model 132, may include and/or be associated with different processor(s), network interface(s), and/or memory, or one or more of these components may utilize some or all of the same processor(s), network interface(s), and/or memory utilized by the speech processing system 122. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 106, the user registry 124 may be configured to determine and/or generate associations between users, user accounts, environment identifiers, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the devices 102(*a*)-(*d*)102(*a*)-(*d*), 104. The user registry 124 may also include information associated with usage of the devices 102(*a*)-(*d*)102(*a*)-(*d*), 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 122 may be configured to receive audio data from the primary devices 102(*a*)-(*d*)102(*a*)-(*d*) and/or other devices and perform speech-processing operations. For example, the ASR component 138 may be configured to generate text data corresponding to the audio data, and the NLU component 140 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "order ice cream," the NLU component 140 may identify a "order" intent and the payload may be "ice cream." In this example where the intent data indicates an intent to purchase ice cream to be delivered to an environment, the speech processing system 122 may call one or more speechlets to effectuate the intent. Speechlets, as described herein may otherwise be described as applications and may include functionality for utilizing intent data to generate directives and/or instructions. For example, a speechlet associated ordering food may be called. The speechlet may be designated as being configured to handle the intent of ordering food, for example. The speechlet may receive the intent data and/or other data associated with the user utterance from the NLU component 140, such as by an orchestrator of the system 106, and may perform operations to place an order for ice cream to be delivered to a given environment, for example. The system 106 may generate audio data confirming that the order has been placed, such as by a text-to-speech component. The audio data may be sent from the system 106 to one or more of the connected devices 102(a)-(d).

The components of the system 100 are described below by way of example. For example, activity predictions and modeling may be performed to determine when to cause the target device 104 to perform certain functionalities. For example, sensor data may be received from the one or more connected devices 102(a)-(d) in an environment associated with the target device. The activity model 126 may be configured to receive the sensor data and to utilize the sensor data to determine one or more activities that users within the environment are engaged in. These activities may include specific activities that a user is engaged in. For example, the activity model 126 may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

By way of example, weakly supervised machine learning can generate approximate labels for unlabeled data associated with acoustic event within a space. Such supervised machine learning may lead to a dramatic reduction in the cost of annotation, increased speed of model development, and improved privacy due to the minimal requirement for human review of customer data. For example, a user may write multiple labeling functions, which are functions that assign approximate labels to a subset of the data points. The relaxed accuracy and coverage requirements of labeling functions make them simple to write. An algorithm may be configured to fuse the labels to produce a single probabilistic label, which has high coverage. The fusion algorithm may provide more weight to labels which tend to agree with other labels, and less to those which disagree. After generating approximate labels, a supervised machine learning model may be trained to predict the labels, which may be described as historical activity modeling. Such as model may be configured to leverage subtle patterns in the data that simple human-defined labeling functions miss, and can make predictions for all data points. An example of such a model may be a dense neural network with two layers, as such models can leverage probabilistic labels and can be fine-tuned on annotated data, such as by transfer learning.

By way of example, sounds from a space may be captured by one or more devices in the space that have a microphone and corresponding audio data may be generated. The audio data may be analyzed to label the sounds. For example, sounds associated with the filling of a pot with water, sounds associated with the click of a gas stovetop, sounds associated with the chopping of food, sounds associated with the sizzle of food items in a pan, etc. may be labeled with their corresponding activities, and probabilistic labeling may be performed utilizing the machine learning techniques described herein. The fusion algorithm may be utilized to fuse the multiple labels into a prediction of an activity of a user being performed in the space. In the example used here, the predefined user activity may be cooking and/or eating. This modeling may be utilized in additional to the device usage data described below to determine a probability that a device, such as a refrigerator, will be utilized when the sounds captured in the space indicate the predefined user activity is being performed.

The usage component 128 may be configured to generate and store target device usage data. For example, over a certain period of time, the target device 104 may be utilized in one or more ways. Utilizing the refrigerator example from above, the door of the refrigerator may be opened and closed, the door of the freezer may be opened and closed, and the ice maker may enable and disable for making ice. When the target device 104 is a "smart" device that is configured to detect operation of various components of the target device 104, the target device 104 may detect usage as described herein and may generate the target device usage data corresponding to that usage. In examples where the target device 104 is not configured to detect usage of its components and/or to generate target device usage data, one or more of the connected devices 102(a)-(d) within the environment may be utilized for detecting usage and generating target device usage data. By way of example, one or more devices having microphones 116 may be utilized to perform acoustic event detection to detect the sound of the target device door being opened and/or shut, and/or the sound of ice falling into a tray from an ice maker, for example. In other examples, the connected devices 102(a)-(d) may include contact sensors that may be placed on the target device 104 to detect the opening and closing of a door. Other sensor data than that specifically used above by way of example may be utilized as well to detect target device usage.

The event component 130 may be configured to determine when certain predefined events occur and/or are likely to occur that are associated with use of the target device 104. Keeping with the refrigerator example above, the event component 130 may be configured to determine when a delivery of food is made and/or is expected to be made at the environment. The food delivery may be an indicator that the target device door will be operated at or near the time of the delivery. Other events may include the purchasing of items, the shipping of items, occurrence of certain scheduled events, certain times of day and/or days of the week, etc. Additionally, the event component 130 may be configured to utilize purchasing data to determine specific food items that are delivered to an environment. For example, a given shipment of food may contain only nonperishable items that are not placed in a refrigerator or freezer. In this example, the event component 130 may be configured to determine that the likelihood of the target device door being opened because of the food delivery is low. In another example, the given shipment of food may contain items that are typically placed in a refrigerator and/or freezer. In this example, the event component 130 may be configured to determine that the likelihood of the target device door being opened because of the food delivery is high.

The target device operation model 132 may be configured to receive activity data from the activity model 126, target device usage data from the usage component 128, and/or event data from the event component 130 to determine one or more probability values that the target device 104 will be operated and/or a number of times the target device 104 will be operated during certain periods of time. To do so, the target device operation model 132 may be trained to determine that the target device 104 is operated when certain predefined activities are detected and/or when certain events occur. For example, the target device operation model 132 may determine that when a cooking activity is detected, such as for a specific target device 104 situated in a specific space and associated with specific account data, the refrigerator target device is operated on average, for example, 5 times. In this example, the target device operation model 132 may determine that cooking activities, when detected, are associated with a greater amount of target device usage than at other times. Other examples of activities the target device operation model 132 may determine are associated with greater target device usage may include, for example, when at least a threshold number of occupants are detected within a given space, such as within a kitchen space and/or a dining room space, when a given user is detected in the space, when presence is detected in a given space and/or within a given number of spaces, and/or when indicators of user entrance and/or exit from a space is detected. The target device operation model 132 may be configured to utilize machine learning techniques, as described more fully below, to identify activities and/or activity factors that are more likely and/or less likely to be associated with target device usage.

For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with the activity detections and target device usage data. The models may be trained for multiple user accounts and/or for a specific user account. As such, the machine learning models may be configured to learn, without human intervention, attributes of collected sensor data and/or detected activities that are more likely and/or less likely to be associated with target device usage.

In addition to the above, the target device operation model 132 may be configured to determine which functionality of the target device 104 is predicted to be performed when given predefined activities are detected. For example, the target device 104 may be a multi-function device, such as the refrigerator target device described herein. In these examples, a first detected activity may be associated with performance of a first functionality of the target device 104 while a second detected activity may be associated with performance of a second, different functionality of the target device 104. In these examples, the target device operation model 132 may be configured to differentiate target device usage as between the multiple functionalities of the target device 104 and to associate such usage with detected activities to determine which activities are associated with performance of the various device functionalities.

The target device operation model 132 may be configured to utilize the generated probability values to determine when a command should be sent to the target device 104 to cause a functionality of the target device 104 to be performed and/or to cause the functionality to not be performed for a given period of time, for example. To do so, for example, the target device operation model 132 may be configured to determine when the probability value satisfies a threshold probability value for generating the command. For example, the target device operation model 132 may determine that the likelihood of the target device 104 being operated when a given activity is detected is 80%, which may represent a high probability value and may result in the generation of a command to be sent to the target device 104. In certain examples, multiple activities may be detected during a given period of time and the collective occurrence of those activities may be associated with a given probability value of the target device 104 being operated. This collective probability value may be utilized to determine when a command is to be sent to the target device 104. It should be understood that while thresholds are utilized by way of example to determine when a given probability value is sufficient for taking action, any other methodology for determining the sufficiency of a likelihood that the target device 104 will be operated may be utilized and is disclosed herein.

The command generator 134 may be configured to receive an indication that performance of a functionality of the target device 104 should occur based at least in part on the probability value determinations described above. The command generator 134 may generate a command configured to cause the functionality to be performed. In examples, the command, when received at the target device 104, may cause the target device 104 to perform the functionality. Utilizing the refrigerator examples above, the command may be to cause a cooling unit of the refrigerator and/or freezer to enable and/or to cause the ice making component to make ice. In other examples, the command may cause the target device 104 to refrain from performing the functionality and/or to perform the functionality at a later time and/or to disable operation of a component of the target device 104. For example, the command may cause a cooling component of the target device 104 to stop cooling, to cause a cooling component not to enable for a given period of time when the door is opened, and/or to cause the cooling component to enable after 15 minutes, for example, from when the command is received.

The functionality controller 136 may be configured to inform the generation of the command and/or to effectuate the command. For example, the functionality controller 136 may indicate the functionalities of the target device 104 and may be utilized to determine the type of command to be generated and sent to the target device 104. The functionality controller 136 may also be utilized to receive the command and to effectuate the command to cause the target device 104 to perform an action associated with the command. In certain examples, the functionality controller 136 may be a component of a system, such as the system 106, that differs from the target device 104. In other examples, the functionality controller 136 may be a component of the target device 104 itself.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102(a)-(d), 104.

As shown in FIG. 1, several of the components of the system 106 and the associated functionality of those components as described herein may be performed by one or more of the devices 102(a)-(d), 104. Additionally, or alternatively, some or all of the components and/or functionalities associated with the devices 102(a)-(d), 104 may be performed by the system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the system 106 may possess its own local memory, which also may store program components, program data, and/or one or more operating systems.

The memory 114 and/or the memory described with respect to the components of the system 106 may include volatile and nonvolatile memory, removable and non-removable media implemented in any method or technology for storage of information, such as computer-readable instructions, data structures, program component, or other data. Such memory 114 and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the system 106 may be implemented as computer-readable storage media ("CRSM"), which may be any available physical media accessible by the processor(s) 110 and/or the processor(s) described with respect to the system 106 to execute instructions stored on the memory 114 and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) described with respect to the components of the system 106 may enable messages between the components and/or devices shown in system 100 and/or with one or more other polling systems, as well as other networked devices. Such network interface(s) 112 and/or the network interface(s) described with respect to the components of the system 106 may include one or more network interface controllers (NICs) or other types of transceiver devices to send and receive messages over the network 108.

For instance, each of the network interface(s) 112 and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (Zig-Bee), IEEE 802.15.1 (Bluetooth), IEEE 802.11 (WiFi), or any other PAN message protocol. Furthermore, each of the network interface(s) 112 and/or the network interface(s) described with respect to the components of the system 106 may include a wide area network (WAN) component to enable message over a wide area network.

In some instances, the system 106 may be local to an environment associated the devices 102(*a*)-(*d*), 104. For instance, the system 106 may be located within one or more of the devices 102(*a*)-(*d*), 104. In some instances, some or all of the functionality of the system 106 may be performed by one or more of the devices 102(*a*)-(*d*), 104. Also, while various components of the system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
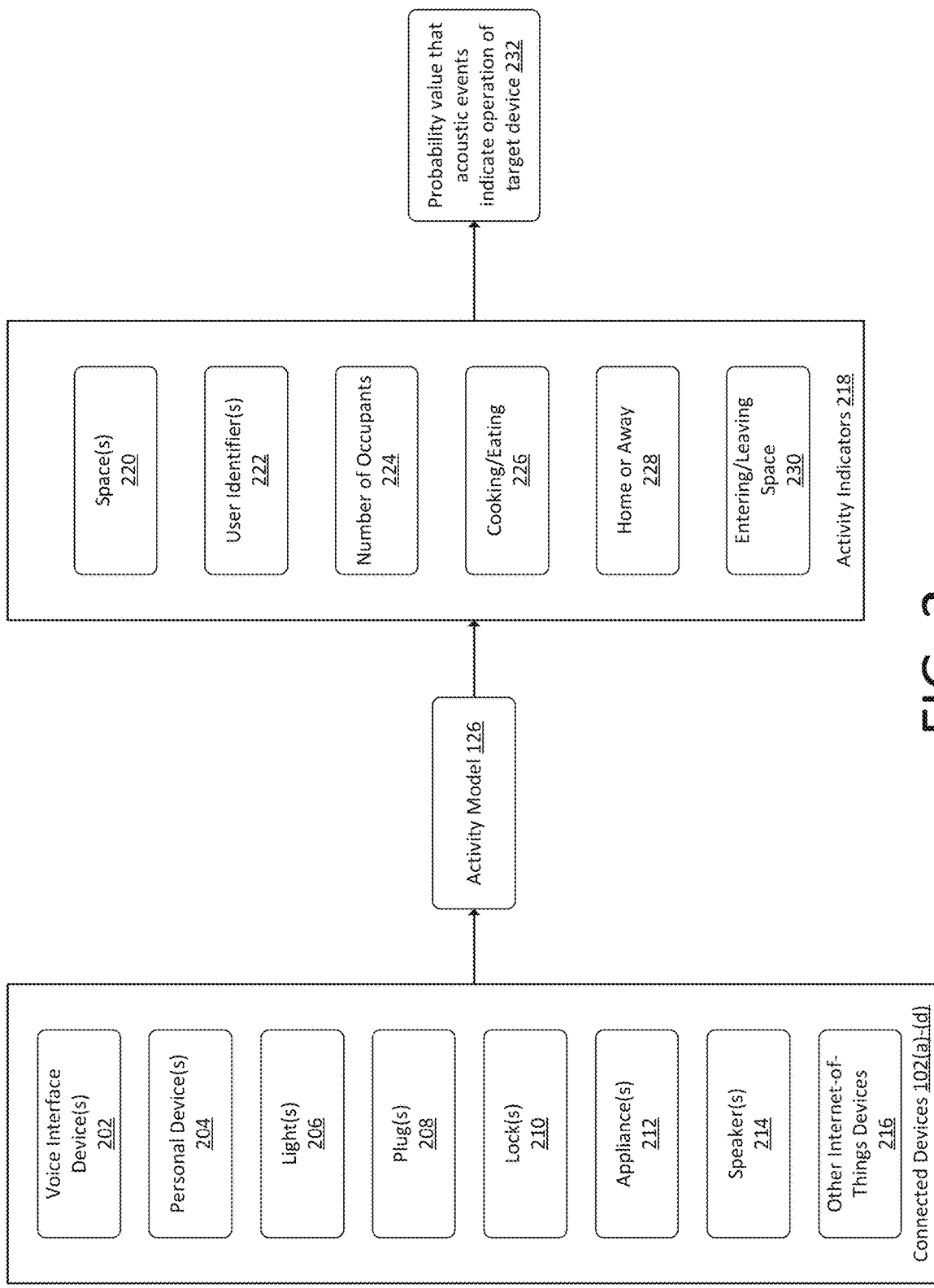
FIG. 2 illustrates a conceptual diagram of example connected devices that generate sensor data for activity modeling.

FIG. 2 illustrates a conceptual diagram of example connected devices that generate sensor data for activity modeling. FIG. 2 includes some of the components described with respect to FIG. 1, such as the activity model 126 and the one or more connected devices 102(*a*)-(*d*). Additionally, FIG. 2 illustrates example connected devices 102(*a*)-(*d*), such as one or more voice interface devices 202, one or more personal devices 204, one or more lights 206, one or more plugs 208, one or more locks 210, one or more appliances 212, one or more speakers 214, and/or other IoT devices 216. Additionally, FIG. 2 illustrates example activity indicators 218. These example activity indicators 218 include one or more spaces 220, one or more user identifiers 222, a number of occupants 224, a cooking and/or eating indicator 226, a home and/or away indicator 228, and/or an indicator that a user is enter and/or leaving a space 230.

One or more of these connected devices 102(*a*)-(*d*) may include a device having a microphone configured to capture audio representing sounds made within the environment and to generate corresponding audio data that may be analyzed as described herein. The connected devices 102(*a*)-(*d*) may also include devices having a camera and/or motion sensor. The devices having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks 210, which may be configured to generate indications of when the door lock 210 is engaged, or otherwise locked, and when the door lock 210 is disengaged, or otherwise unlocked. The connected devices 102(*a*)-(*d*) may also include devices having an audio-output component, such as speakers 214, that may be configured to output audio into the environment. The connected devices 102(*a*)-(*d*) may also include other devices that may be controlled utilizing, for example, voice input and/or other user input such as user input received via a user interface. These connected devices 102(*a*)-(*d*) may be, for example and not by way of limitation, lights 206, switches, plugs 208, vehicles, televisions, thermostats, doorbells, appliances 210, window treatments, security systems, etc. The connected devices 102(*a*)-(*d*) may also include the personal devices 204, such as cellphones, tablets, personal computers, etc., which may be configured to communicate with other devices within the environment when the personal devices are brought into the environment. Some or all of these devices may generate sensor data associated with the connected devices 102(*a*)-(*d*). Again, it should be understood that these connected devices 102(*a*)-(*d*) are provided by way of illustration and not as a limitation. The connected devices 102(*a*)-(*d*) may be any device that may generate any sort of sensor data.

The activity model 126 may be configured to receive the sensor data and to utilize the sensor data to determine one or more activities that users within the environment are engaged in. These activities may also include specific activities that a user is engaged in. For example, the activity model 126 may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device 204 associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

As output from the activity model 126, the one or more activity indicators 218 may be generated. The spaces 220 may indicate a given space and/or spaces where presence is detected and/or where one or more other activities are detected. The user identifiers 222 may indicate a given user profile associated with a user detected within a space. The number of occupants 224 may indicate a number of users detected as present in a given space and/or detected as being involved in the activity in question. The cooking and/or eating indicator 226 may indicate that at least one user is engaged in cooking and/or eating in the space. The home and/or away indicator 228 may indicate whether a user is present in an environment or whether no users are detected as being present in the environment. The entering and/or leaving space indicator 230 may indicate whether motion associated with a user represents the user entering a given space or leaving a given space, such as from the sound of footsteps moving away from or toward a device having a microphone and/or from image data indicating movement and/or from signal strength data from a personal device carried by the user. Again, these activity indicators 218 are provided by way of example and not as a limitation. Any other activity may be detected and the activity indicators 218 may indicate those other activities.

By way of example, weakly supervised machine learning can generate approximate labels for unlabeled data associated with acoustic event within a space. Such supervised machine learning may lead to a dramatic reduction in the cost of annotation, increased speed of model development, and improved privacy due to the minimal requirement for human review of customer data. For example, a user may write multiple labeling functions, which are functions that assign approximate labels to a subset of the data points. The relaxed accuracy and coverage requirements of labeling functions make them simple to write. An algorithm may be configured to fuse the labels to produce a single probabilistic label, which has high coverage. The fusion algorithm may provide more weight to labels which tend to agree with other labels, and less to those which disagree. After generating approximate labels, a supervised machine learning model may be trained to predict the labels, which may be described as historical activity modeling. Such as model may be configured to leverage subtle patterns in the data that simple human-defined labeling functions miss, and can make predictions for all data points. An example of such a model may be a dense neural network with two layers, as such models can leverage probabilistic labels and can be fine-tuned on annotated data, such as by transfer learning.

By way of example, sounds from a space may be captured by one or more devices in the space that have a microphone and corresponding audio data may be generated. The audio data may be analyzed to label the sounds. For example, sounds associated with the filling of a pot with water, sounds associated with the click of a gas stovetop, sounds associated with the chopping of food, sounds associated with the sizzle of food items in a pan, etc. may be labeled with their corresponding activities, and probabilistic labeling may be performed utilizing the machine learning techniques described herein. The fusion algorithm may be utilized to fuse the multiple labels into a prediction of an activity of a user being performed in the space. In the example used here, the predefined user activity may be cooking and/or eating. This modeling may be utilized in additional to the device usage data described below to determine a probability that a device, such as a refrigerator, will be utilized when the sounds captured in the space indicate the predefined user activity is being performed. In these examples, a probability value that acoustic events detected from sound within an environment indicate operation of the target device 232 may be determined and utilized for determining when commands are to be sent to the target device to perform one or more of the functions described herein.

Figure 3:
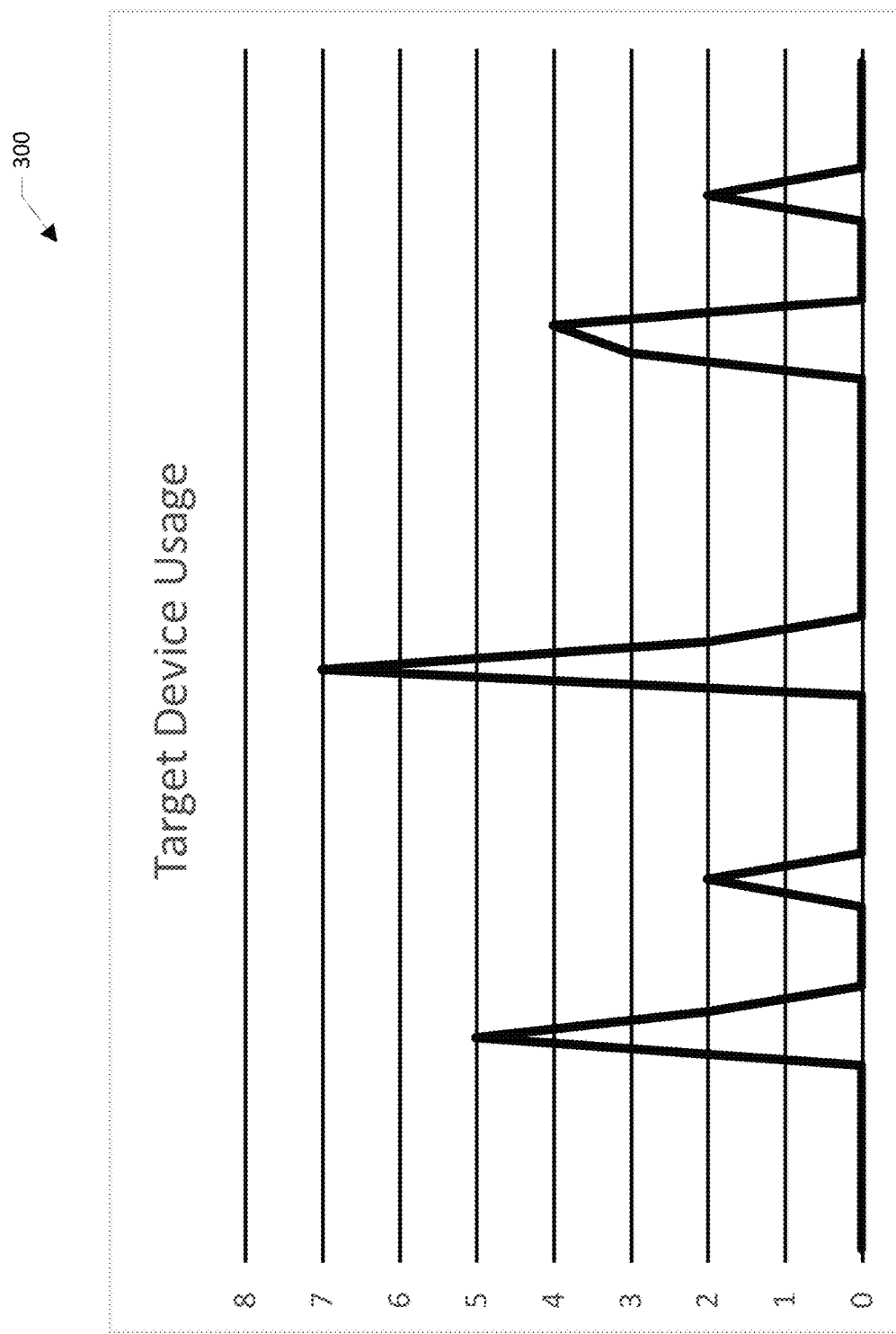
FIG. 3 illustrates a conceptual diagram of example target device usage data over time for target device operation modeling.

FIG. 3 illustrates a conceptual diagram of example target device usage data 300 over time for target device operation modeling. For example, a usage component may be configured to generate and store target device usage data. For example, over a certain period of time, the target device may be utilized in one or more ways. Utilizing the refrigerator example from above, the door of the refrigerator may be opened and closed, the door of the freezer may be opened and closed, and the ice maker may enable and disable for making ice. When the target device is a "smart" device that is configured to detect operation of various components of the target device, the target device may detect usage as described herein and may generate the target device usage data corresponding to that usage. In examples where the target device is not configured to detect usage of its components and/or to generate target device usage data, one or more of the connected devices within the environment may be utilized for detecting usage and generating target device usage data. By way of example, one or more devices having microphones may be utilized to perform acoustic event detection to detect the sound of the target device door being opened and/or shut, and/or the sound of ice falling into a tray from an ice maker, for example. In other examples, the connected devices may include contact sensors that may be placed on the target device to detect the opening and closing of a door. Other sensor data than that specifically used above by way of example may be utilized as well to detect target device usage.

Using FIG. 3 as an example, the x-axis illustrates the passage of time, here the target device usage data 300 is generated over the course of a 24-hour period of time. The y-axis illustrates the number of times a component of the device is operated. In this example, again not by way of limitation, the component is a door, and operation of the component is the opening of the door. As seen in the chart, the usage component collects the device usage data indicating that the door is not opened until approximately 6:00 am and then it is opened 5 times during a 30-minute period of time starting at 6:00 am. The door remains closed until approximately 8:00 am when it is opened 2 times during a 30-minutes period of time starting at 8:00 am. The door then remains closed again until approximately noon, when it is opened 7 times during a 30-minute period of time starting at noon. Then the door is opened 4 times around 7:00 pm and 2 times around 10:00 pm. This target device usage data may be associated with activities detected over this period of time, as described in more detail elsewhere herein, to determine which activities are most closely associated with operation of the target device. This usage data for a specific period of time may be averaged or otherwise correlated with usage data over other periods of time to determine average and/or typical target device usage to be associated with detected activities.

Figure 4:
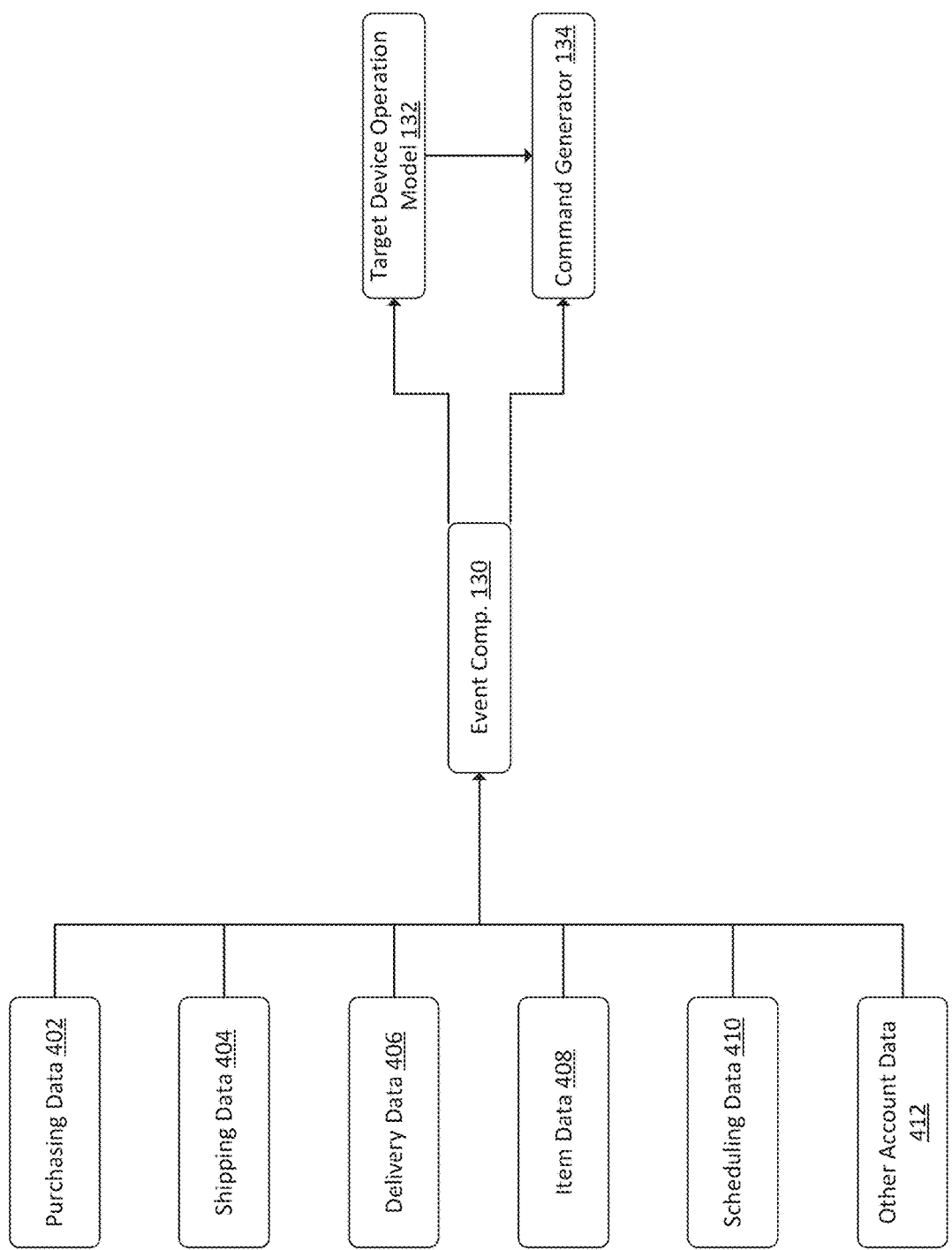
FIG. 4 illustrates a conceptual diagram of example event data utilized for target device operation modeling.

FIG. 4 illustrates a conceptual diagram of example event data utilized for target device operation modeling. FIG. 4 includes some components that are similar to those described with respect to FIG. 1, such as the event component 130, the target device operation model 132, and/or the command generator 134. FIG. 4 also includes data types such as purchasing data 402, shipping data 404, delivery data 406, item data 408, scheduling data 410, and/or other account data 412 that may be utilized by the event component 130.

For example, the event component 130 may be configured to determine when certain predefined events occur and/or are likely to occur that are associated with use of the target device. Keeping with the refrigerator example above, the event component 130 may be configured to determine when a delivery of food is made and/or is expected to be made at the environment, such as by utilizing the delivery data 406 and/or the shipping data 404. The food delivery may be an indicator that the target device door will be operated at or near the time of the delivery. Other events may include the purchasing of items, the shipping of items, occurrence of certain scheduled events, certain times of day and/or days of the week, etc. For example, the purchasing data 402 may be utilized to determine whether the items purchased are from a merchant that sells items associated with the target device. Additionally, the scheduling data 410 may be utilized to inform the activity predictions described herein and/or to inform when the target device may be utilized. Additionally, the event component 130 may be configured to utilize the purchasing data 402 and/or the item data 408 to determine specific food items that are delivered to an environment. For example, a given shipment of food may contain only nonperishable items that are not placed in a refrigerator or freezer. In this example, the event component 130 may be configured to determine that the likelihood of the target device door being opened because of the food delivery is low. In another example, the given shipment of food may contain items that are typically placed in a refrigerator and/or freezer. In this example, the event component 130 may be configured to determine that the likelihood of the target device door being opened because of the food delivery is high.

In some examples, the output from the event component 130 may be utilized by the target device operation model 132 to assist in determining a probability value that the target device will be operated when a given event and/or activity is detected. The target device operation model 132 may then utilize that probability value to determine when a command is to be generated by the command generator 134, as described more fully herein. In other examples, the output from the event component 130 may be utilized directly by the command generator 134 to generate a command. For example, the event identified by the event component 130 may be a strong indicator that the target device will be operated within a certain period of time from when the event occurs, such as when a delivery is received, a user is determined to be home, the items in the order include a perishable item, and/or when a notification of the delivery has been sent to and/or accepted by a personal device associated with the user. In this example, the target device operation model 132 may be skipped and the command may be generated and sent to the target device.

Figure 5:
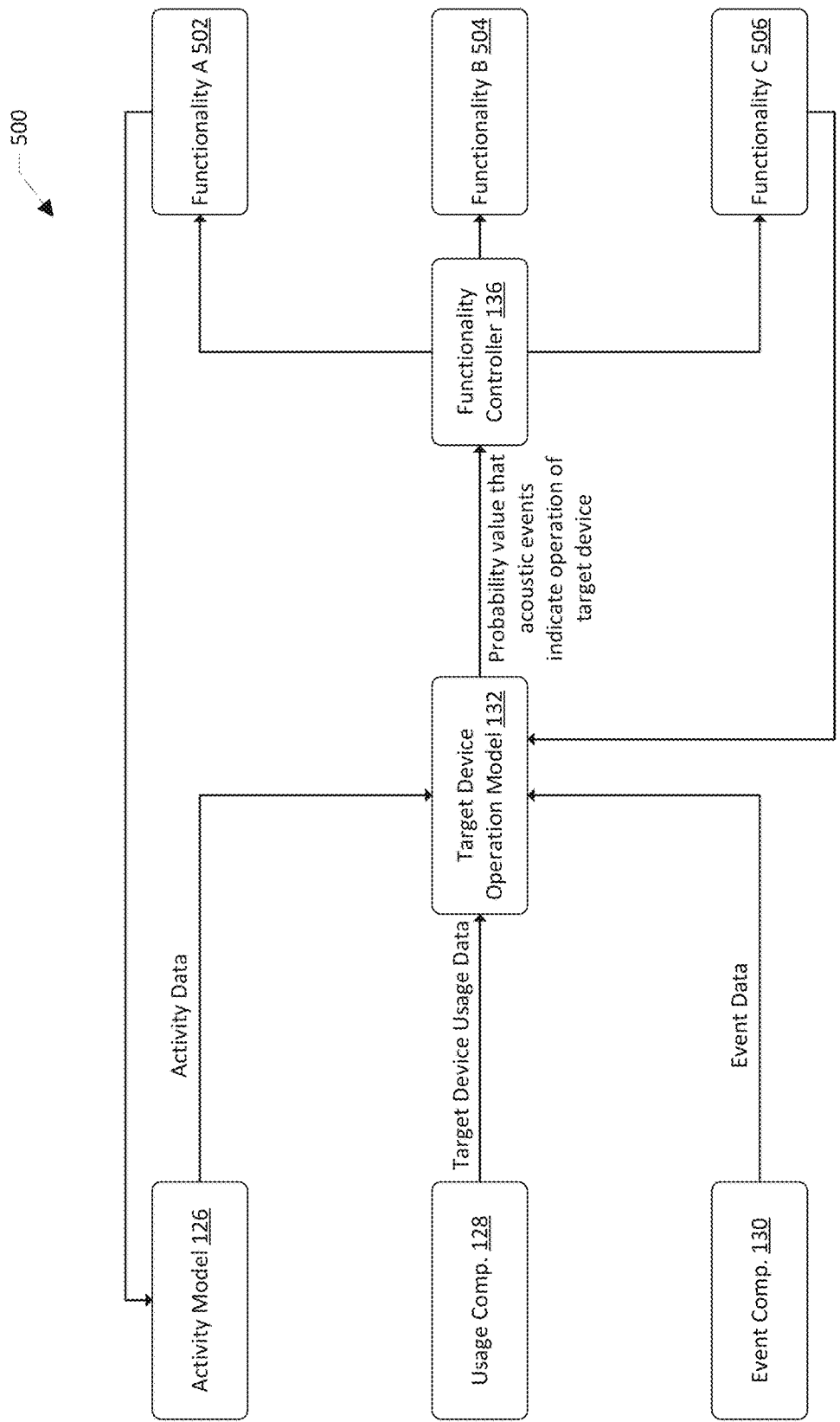
FIG. 5 illustrates a conceptual diagram of how a target device operation model may be utilized for predicting probability values that a target device will operate during a given period of time, and controlling one or more functionalities of the target device based on the probability values.

FIG. 5 illustrates a conceptual diagram of how a target device operation model may be utilized for predicting probability values that a target device will operate during a given period of time, and controlling one or more functionalities of the target device based on the probability values. FIG. 5 includes some of the components from FIG. 1, including the activity model 126, the usage component 128, the event component 130, the target device operation model 132, and the functionality controller 136. Additionally, FIG. 5 illustrates multiple functionalities associated with a given target device that the functionality controller 136 may be configured to cause to be performed.

For example, the target device operation model 132 may be configured to receive activity data from the activity model 126, target device usage data from the usage component 128, and/or event data from the event component 130 to determine one or more probability values that the target device will be operated and/or a number of times the target device 104 will be operated during certain periods of time. To do so, the target device operation model 132 may be trained to determine that the target device is operated when certain predefined activities are detected and/or when certain events occur. For example, the target device operation model 132 may determine that when a cooking activity is detected, such as for a specific target device situated in a specific space and associated with specific account data, the refrigerator target device is operated on average, for example, 5 times. In this example, the target device operation model 132 may determine that cooking activities, when detected, are associated with a greater amount of target device usage than at other times. Other examples of activities the target device operation model 132 may determine are associated with greater target device usage may include, for example, when at least a threshold number of occupants are detected within a given space, such as within a kitchen space and/or a dining room space, when a given user is detected in the space, when presence is detected in a given space and/or within a given number of spaces, and/or when indicators of user entrance and/or exit from a space is detected. The target device operation model 132 may be configured to utilize machine learning techniques, as described more fully below, to identify activities and/or activity factors that are more likely and/or less likely to be associated with target device usage.

In addition to the above, the target device operation model 132 may be configured to determine which functionality of the target device is predicted to be performed when given predefined activities are detected. For example, the target device may be a multi-function device, such as the refrigerator target device described herein. In these examples, a first detected activity may be associated with performance of a first functionality of the target device, such as Functionality A 502, while a second detected activity may be associated with performance of a second, different functionality of the target device, such as Functionality B 504, and yet a third detected activity may be associated with performance of a third functionality, such as Functionality C 506. In these examples, the target device operation model 132 may be configured to differentiate target device usage as between the multiple functionalities of the target device and to associate such usage with detected activities to determine which activities are associated with performance of the various device functionalities.

The target device operation model 132 may be configured to utilize the generated probability values to determine when a command should be sent to the target device to cause a functionality of the target device to be performed and/or to cause the functionality to not be performed for a given period of time, for example. To do so, for example, the target device operation model 132 may be configured to determine when the probability value satisfies a threshold probability value for generating the command. For example, the target device operation model 132 may determine that the likelihood of the target device being operated when a given activity is detected is 80%, which may represent a high probability value and may result in the generation of a command to be sent to the target device. In certain examples, multiple activities may be detected during a given period of time and the collective occurrence of those activities may be associated with a given probability value of the target device being operated. This collective probability value may be utilized to determine when a command is to be sent to the target device. It should be understood that while thresholds are utilized by way of example to determine when a given probability value is sufficient for taking action, any other methodology for determining the sufficiency of a likelihood that the target device 104 will be operated may be utilized and is disclosed herein.

The command generator 134 may be configured to receive an indication that performance of a functionality of the target device should occur based at least in part on the probability value determinations described above. The command generator 134 may generate a command configured to cause the functionality to be performed. In examples, the command, when received at the target device, may cause the target device to perform the functionality. Utilizing the refrigerator examples above, the command may be to cause a cooling unit of the refrigerator and/or freezer to enable and/or to cause the ice making component to make ice. In other examples, the command may cause the target device to refrain from performing the functionality and/or to perform the functionality at a later time and/or to disable operation of a component of the target device. For example, the command may cause a cooling component of the target device to stop cooling, to cause a cooling component not to enable for a given period of time when the door is opened, and/or to cause the cooling component to enable after 15 minutes, for example, from when the command is received.

The functionality controller 136 may be configured to inform the generation of the command and/or to effectuate the command. For example, the functionality controller 136 may indicate the functionalities of the target device and may be utilized to determine the type of command to be generated and sent to the target device. The functionality controller 136 may also be utilized to receive the command and to effectuate the command to cause the target device to perform an action associated with the command. In certain examples, the functionality controller 136 may be a component of a system that differs from the target device. In other examples, the functionality controller 136 may be a component of the target device itself.

Figure 6:
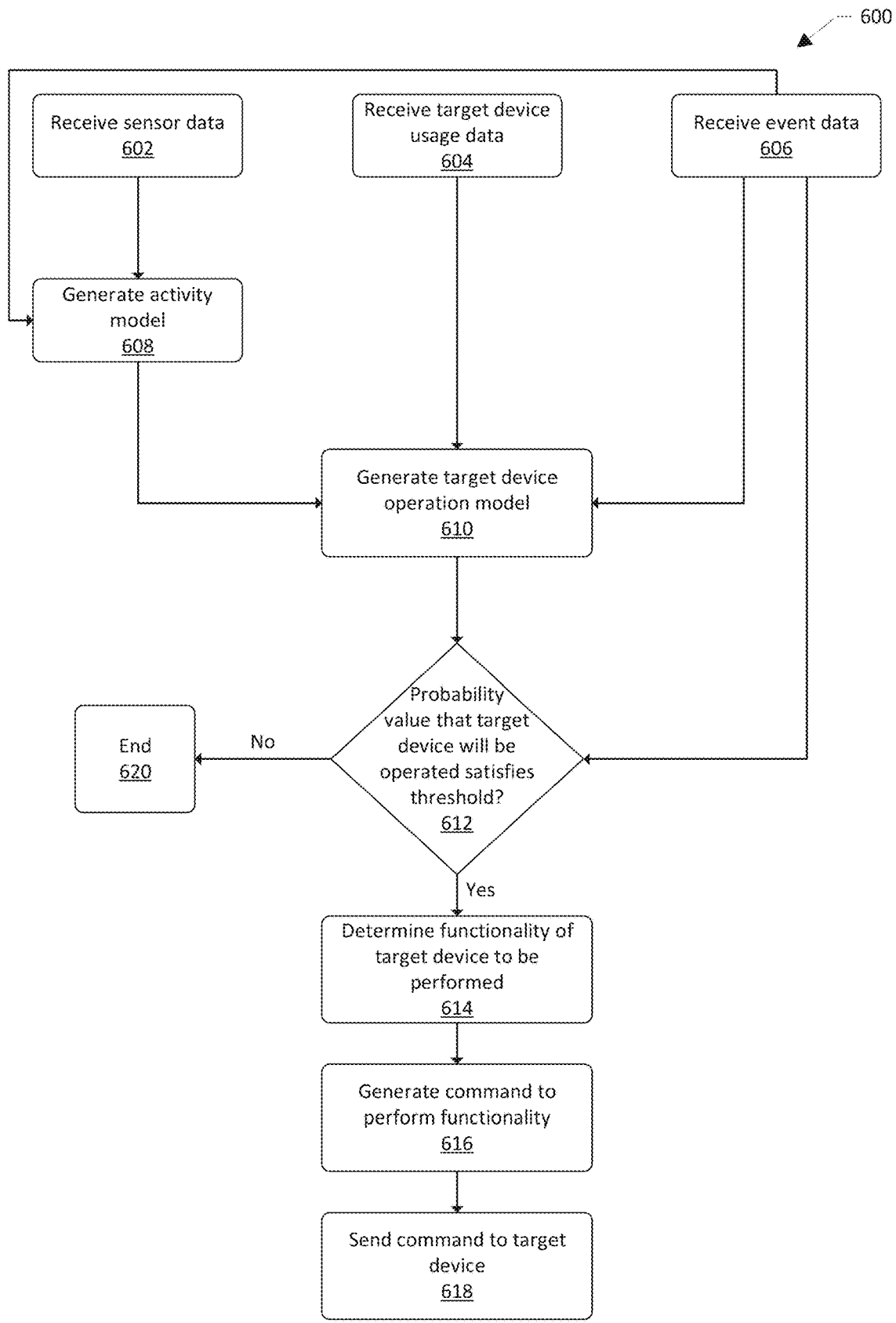
FIG. 6 illustrates a flow diagram of an example process for generating and/or training activity models and target device operation models utilized for device functionality control.

FIGS. 6-8 illustrates processes for device functionality control utilizing activity prediction. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 9-11, although the processes may be implemented in a wide variety of other environments, architectures and systems.

FIG. 6 illustrates a flow diagram of an example process 600 for generating and/or training activity models and target device operation models utilized for device functionality control. The order in which the operations or steps are described is not intended to be construed as a limitation, and any number of the described operations may be combined in any order and/or in parallel to implement process 600.

At block 602, the process 600 may include receiving sensor data from one or more connected devices associated with a target device. For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

At block 604, the process 600 may include receiving target device usage data from the target device and/or one or more other devices. For example, over a certain period of time, the target device may be utilized in one or more ways. Utilizing the refrigerator example from above, the door of the refrigerator may be opened and closed, the door of the freezer may be opened and closed, and the ice maker may enable and disable for making ice. When the target device is a "smart" device that is configured to detect operation of various components of the target device, the target device may detect usage as described herein and may generate the target device usage data corresponding to that usage. In examples where the target device is not configured to detect usage of its components and/or to generate target device usage data, one or more of the connected devices within the environment may be utilized for detecting usage and generating target device usage data. By way of example, one or more devices having microphones may be utilized to perform acoustic event detection to detect the sound of the target device door being opened and/or shut, and/or the sound of ice falling into a tray from an ice maker, for example. In other examples, the connected devices may include contact sensors that may be placed on the target device to detect the opening and closing of a door. Other sensor data than that specifically used above by way of example may be utilized as well to detect target device usage.

At block 606, the process 600 may include receiving event data associated with the target device. For example, an event component may be configured to determine when certain predefined events occur and/or are likely to occur that are associated with use of the target device. Keeping with the refrigerator example above, the event component may be configured to determine when a delivery of food is made and/or is expected to be made at the environment. The food delivery may be an indicator that the target device door will be operated at or near the time of the delivery. Other events may include the purchasing of items, the shipping of items, occurrence of certain scheduled events, certain times of day and/or days of the week, etc. Additionally, the event component may be configured to utilize purchasing data to determine specific food items that are delivered to an environment. For example, a given shipment of food may contain only nonperishable items that are not placed in a refrigerator or freezer. In this example, the event component may be configured to determine that the likelihood of the target device door being opened because of the food delivery is low. In another example, the given shipment of food may contain items that are typically placed in a refrigerator and/or freezer. In this example, the event component may be configured to determine that the likelihood of the target device door being opened because of the food delivery is high.

At block 608, the process 600 may include generating an activity model based at least in part on the sensor data. For example, the activity model may be configured to receive the sensor data and to utilize the sensor data to determine one or more activities that users within the environment are engaged in. These activities may include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

By way of example, weakly supervised machine learning can generate approximate labels for unlabeled data associated with acoustic event within a space. Such supervised machine learning may lead to a dramatic reduction in the cost of annotation, increased speed of model development, and improved privacy due to the minimal requirement for human review of customer data. For example, a user may write multiple labeling functions, which are functions that assign approximate labels to a subset of the data points. The relaxed accuracy and coverage requirements of labeling functions make them simple to write. An algorithm may be configured to fuse the labels to produce a single probabilistic label, which has high coverage. The fusion algorithm may provide more weight to labels which tend to agree with other labels, and less to those which disagree. After generating approximate labels, a supervised machine learning model may be trained to predict the labels, which may be described as historical activity modeling. Such as model may be configured to leverage subtle patterns in the data that simple human-defined labeling functions miss, and can make predictions for all data points. An example of such a model may be a dense neural network with two layers, as such models can leverage probabilistic labels and can be fine-tuned on annotated data, such as by transfer learning.

By way of example, sounds from a space may be captured by one or more devices in the space that have a microphone and corresponding audio data may be generated. The audio data may be analyzed to label the sounds. For example, sounds associated with the filling of a pot with water, sounds associated with the click of a gas stovetop, sounds associated with the chopping of food, sounds associated with the sizzle of food items in a pan, etc. may be labeled with their corresponding activities, and probabilistic labeling may be performed utilizing the machine learning techniques described herein. The fusion algorithm may be utilized to fuse the multiple labels into a prediction of an activity of a user being performed in the space. In the example used here, the predefined user activity may be cooking and/or eating. This modeling may be utilized in additional to the device usage data described below to determine a probability that a device, such as a refrigerator, will be utilized when the sounds captured in the space indicate the predefined user activity is being performed.

At block 610, the process 600 may include generating a target device operation model based at least in part on output from the activity model, the target device usage data, and/or the event data. For example, the target device operation model may be configured to receive activity data from the activity model, target device usage data from the usage component, and/or event data from the event component to determine one or more probability values that the target device will be operated and/or a number of times the target device will be operated during certain periods of time. To do so, the target device operation model may be trained to determine that the target device is operated when certain predefined activities are detected and/or when certain events occur. For example, the target device operation model may determine that when a cooking activity is detected, such as for a specific target device situated in a specific space and associated with specific account data, the refrigerator target device is operated on average, for example, 5 times. In this example, the target device operation model may determine that cooking activities, when detected, are associated with a greater amount of target device usage than at other times. Other examples of activities the target device operation model may determine are associated with greater target device usage may include, for example, when at least a threshold number of occupants are detected within a given space, such as within a kitchen space and/or a dining room space, when a given user is detected in the space, when presence is detected in a given space and/or within a given number of spaces, and/or when indicators of user entrance and/or exit from a space is detected. The target device operation model may be configured to utilize machine learning techniques, as described more fully below, to identify activities and/or activity factors that are more likely and/or less likely to be associated with target device usage.

At block 612, the process 600 may include determining whether a probability value that the target device will be operated satisfies a threshold probability value. For example, the target device operation model may be configured to utilize the generated probability values to determine when a command should be sent to the target device to cause a functionality of the target device to be performed and/or to cause the functionality to not be performed for a given period of time, for example. To do so, for example, the target device operation model may be configured to determine when the probability value satisfies a threshold probability value for generating the command.

In situations where the probability value satisfies the threshold probability value, the process 600 may include, at block 614, determining a functionality of the target device to be performed. For example, the target device operation model may determine that the likelihood of the target device being operated when a given activity is detected is 80%, which may represent a high probability value and may result in the generation of a command to be sent to the target device. In certain examples, multiple activities may be detected during a given period of time and the collective occurrence of those activities may be associated with a given probability value of the target device being operated. This collective probability value may be utilized to determine when a command is to be sent to the target device. It should be understood that while thresholds are utilized by way of example to determine when a given probability value is sufficient for taking action, any other methodology for determining the sufficiency of a likelihood that the target device will be operated may be utilized and is disclosed herein.

Thereafter, the target device operation model may be configured to determine which functionality of the target device is predicted to be performed when given predefined activities are detected. For example, the target device may be a multi-function device, such as the refrigerator target device described herein. In these examples, a first detected activity may be associated with performance of a first functionality of the target device while a second detected activity may be associated with performance of a second, different functionality of the target device. In these examples, the target device operation model may be configured to differentiate target device usage as between the multiple functionalities of the target device and to associate such usage with detected activities to determine which activities are associated with performance of the various device functionalities.

At block 616, the process 600 may include generating a command to perform the functionality. For example, a command generator may generate a command configured to cause the functionality to be performed. In examples, the command, when received at the target device, may cause the target device to perform the functionality. Utilizing the refrigerator examples above, the command may be to cause a cooling unit of the refrigerator and/or freezer to enable and/or to cause the ice making component to make ice. In other examples, the command may cause the target device to refrain from performing the functionality and/or to perform the functionality at a later time and/or to disable operation of a component of the target device. For example, the command may cause a cooling component of the target device to stop cooling, to cause a cooling component not to enable for a given period of time when the door is opened, and/or to cause the cooling component to enable after 15 minutes, for example, from when the command is received.

At block 618, the process 600 may include sending the command to the target device. The command may be sent to the target device to cause the target device to perform a function as described herein. In other examples, the command may be sent to a voice interface device, which may send an instance of the command and/or a different command to the target device to perform the function.

Return to block 612, in instances where the probability value does not satisfy the threshold probability value, the process 600 may end at block 620. In these examples, a command for the target device to perform one or more functionalities may not be sent, and instead the target device may operate as it would without receiving the command.

FIG. 7 illustrates a flow diagram of an example process 700 for device functionality control utilizing activity prediction. The order in which the operations or steps are described is not intended to be construed as a limitation, and any number of the described operations may be combined in any order and/or in parallel to implement process 700.

At block 702, the process 700 may include receiving, from first devices and during a period of time, first data indicating sounds made in a space in which the first devices are disposed, the first devices being associated with a second device configured to refrigerate items within the second device. For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

At block 704, the process 700 may include generating, utilizing the first data, second data indicating that the sounds are associated with a predefined user activity within the space, the predefined user activity being predefined to be associated with use of the second device. For example, an activity model may be configured to receive the sensor data and to utilize the sensor data to determine one or more activities that users within the environment are engaged in. These activities may include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

By way of example, weakly supervised machine learning can generate approximate labels for unlabeled data associated with acoustic event within a space. Such supervised machine learning may lead to a dramatic reduction in the cost of annotation, increased speed of model development, and improved privacy due to the minimal requirement for human review of customer data. For example, a user may write multiple labeling functions, which are functions that assign approximate labels to a subset of the data points. The relaxed accuracy and coverage requirements of labeling functions make them simple to write. An algorithm may be configured to fuse the labels to produce a single probabilistic label, which has high coverage. The fusion algorithm may provide more weight to labels which tend to agree with other labels, and less to those which disagree. After generating approximate labels, a supervised machine learning model may be trained to predict the labels, which may be described as historical activity modeling. Such as model may be configured to leverage subtle patterns in the data that simple human-defined labeling functions miss, and can make predictions for all data points. An example of such a model may be a dense neural network with two layers, as such models can leverage probabilistic labels and can be fine-tuned on annotated data, such as by transfer learning.

By way of example, sounds from a space may be captured by one or more devices in the space that have a microphone and corresponding audio data may be generated. The audio data may be analyzed to label the sounds. For example, sounds associated with the filling of a pot with water, sounds associated with the click of a gas stovetop, sounds associated with the chopping of food, sounds associated with the sizzle of food items in a pan, etc. may be labeled with their corresponding activities, and probabilistic labeling may be performed utilizing the machine learning techniques described herein. The fusion algorithm may be utilized to fuse the multiple labels into a prediction of an activity of a user being performed in the space. In the example used here, the predefined user activity may be cooking and/or eating. This modeling may be utilized in additional to the device usage data described below to determine a probability that a device, such as a refrigerator, will be utilized when the sounds captured in the space indicate the predefined user activity is being performed.

At block 706, the process 700 may include receiving, from the second device and during the period of time, third data indicating that a door of the second device is opened. For example, over a certain period of time, the target device may be utilized in one or more ways. Utilizing the refrigerator example from above, the door of the refrigerator may be opened and closed, the door of the freezer may be opened and closed, and the ice maker may enable and disable for making ice. When the target device is a "smart" device that is configured to detect operation of various components of the target device, the target device may detect usage as described herein and may generate the target device usage data corresponding to that usage. In examples where the target device is not configured to detect usage of its components and/or to generate target device usage data, one or more of the connected devices within the environment may be utilized for detecting usage and generating target device usage data. By way of example, one or more devices having microphones may be utilized to perform acoustic event detection to detect the sound of the target device door being opened and/or shut, and/or the sound of ice falling into a tray from an ice maker, for example. In other examples, the connected devices may include contact sensors that may be placed on the target device to detect the opening and closing of a door. Other sensor data than that specifically used above by way of example may be utilized as well to detect target device usage.

At block 708, the process 700 may include generating, utilizing the second data and the third data, fourth data indicating a first probability value that the door of the second device will be opened when the predefined user activity is detected. For example, a target device operation model may be configured to receive activity data from the activity model, target device usage data from the usage component, and/or event data from the event component to determine one or more probability values that the target device will be operated and/or a number of times the target device will be operated during certain periods of time. To do so, the target device operation model may be trained to determine that the target device is operated when certain predefined activities are detected and/or when certain events occur. For example, the target device operation model may determine that when a cooking activity is detected, such as for a specific target device situated in a specific space and associated with specific account data, the refrigerator target device is operated on average, for example, 5 times. In this example, the target device operation model may determine that cooking activities, when detected, are associated with a greater amount of target device usage than at other times. Other examples of activities the target device operation model may determine are associated with greater target device usage may include, for example, when at least a threshold number of occupants are detected within a given space, such as within a kitchen space and/or a dining room space, when a given user is detected in the space, when presence is detected in a given space and/or within a given number of spaces, and/or when indicators of user entrance and/or exit from a space is detected. The target device operation model may be configured to utilize machine learning techniques, as described more fully below, to identify activities and/or activity factors that are more likely and/or less likely to be associated with target device usage.

At block 710, the process 700 may include sending, to the second device and in response to detecting the predefined user activity from acoustic events within the space, a first command configured to cause a temperature control component of the second device to delay cooling within the second device. For example, a command generator may generate a command configured to cause functionality associated with the second device to be performed. In examples, the command, when received at the target device, may cause the target device to perform the functionality. Utilizing the refrigerator examples above, the command may be to cause a cooling unit of the refrigerator and/or freezer to enable and/or to cause the ice making component to make ice. In other examples, the command may cause the target device to refrain from performing the functionality and/or to perform the functionality at a later time and/or to disable operation of a component of the target device. For example, the command may cause a cooling component of the target device to stop cooling, to cause a cooling component not to enable for a given period of time when the door is opened, and/or to cause the cooling component to enable after 15 minutes, for example, from when the command is received.

Additionally, or alternatively, the process 700 may include storing account data associating the second device with a profile utilized to acquire items associated with the second device. The process 700 may also include receiving fifth data indicating that at least a portion of the items have been acquired. The process 700 may also include determining, from sixth data received from at least one of the first devices, that a user associated with the acquisition of the items has arrived at the space. The process 700 may also include sending the command in response to the fifth data indicating the at least the portion of the items have been acquired and that the user has arrived at the space.

Additionally, or alternatively, the process 700 may include determining, utilizing the first data, a portion of the space in which the predefined user activity is detected, the portion of the space associated with the second device. The process 700 may also include determining, utilizing the first data, a number of users including the user within at least the portion of the space. In these examples, generating the second data indicating that the user is engaged in the predefined user activity may be from determining the predefined activity was detected in the portion of the space and from the number of the users.

Additionally, or alternatively, the process 700 may include storing account data associating the second device with a profile utilized to acquire items associated with the second device. The process 700 may also include receiving fifth data indicating that a delivery associated with the profile includes an item predefined to be stored in the second device. The process 700 may also include sending, in response to receiving the fifth data, the command to the second device.

FIG. 8 illustrates a flow diagram of another example process 800 for device functionality control utilizing activity prediction. The order in which the operations or steps are described is not intended to be construed as a limitation, and any number of the described operations may be combined in any order and/or in parallel to implement process 800.

At block 802, the process 800 may include receiving, from a first device and during a period of time, first data representing sounds made in a space in which the first device is disposed. For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

At block 804, the process 800 may include generating, based at least in part on the first data, second data indicating that the sounds are associated with a predefined user activity within the space. For example, an activity model may be configured to receive the sensor data and to utilize the sensor data to determine one or more activities that users within the environment are engaged in. These activities may include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

By way of example, weakly supervised machine learning can generate approximate labels for unlabeled data associated with acoustic event within a space. Such supervised machine learning may lead to a dramatic reduction in the cost of annotation, increased speed of model development, and improved privacy due to the minimal requirement for human review of customer data. For example, a user may write multiple labeling functions, which are functions that assign approximate labels to a subset of the data points. The relaxed accuracy and coverage requirements of labeling functions make them simple to write. An algorithm may be configured to fuse the labels to produce a single probabilistic label, which has high coverage. The fusion algorithm may provide more weight to labels which tend to agree with other labels, and less to those which disagree. After generating approximate labels, a supervised machine learning model may be trained to predict the labels, which may be described as historical activity modeling. Such as model may be configured to leverage subtle patterns in the data that simple human-defined labeling functions miss, and can make predictions for all data points. An example of such a model may be a dense neural network with two layers, as such models can leverage probabilistic labels and can be fine-tuned on annotated data, such as by transfer learning.

By way of example, sounds from a space may be captured by one or more devices in the space that have a microphone and corresponding audio data may be generated. The audio data may be analyzed to label the sounds. For example, sounds associated with the filling of a pot with water, sounds associated with the click of a gas stovetop, sounds associated with the chopping of food, sounds associated with the sizzle of food items in a pan, etc. may be labeled with their corresponding activities, and probabilistic labeling may be performed utilizing the machine learning techniques described herein. The fusion algorithm may be utilized to fuse the multiple labels into a prediction of an activity of a user being performed in the space. In the example used here, the predefined user activity may be cooking and/or eating. This modeling may be utilized in additional to the device usage data described below to determine a probability that a device, such as a refrigerator, will be utilized when the sounds captured in the space indicate the predefined user activity is being performed.

At block 806, the process 800 may include receiving, from a second device and during the period of time, third data indicating that a door of the second device is opened. For example, over a certain period of time, the target device may be utilized in one or more ways. Utilizing the refrigerator example from above, the door of the refrigerator may be opened and closed, the door of the freezer may be opened and closed, and the ice maker may enable and disable for making ice. When the target device is a "smart" device that is configured to detect operation of various components of the target device, the target device may detect usage as described herein and may generate the target device usage data corresponding to that usage. In examples where the target device is not configured to detect usage of its components and/or to generate target device usage data, one or more of the connected devices within the environment may be utilized for detecting usage and generating target device usage data. By way of example, one or more devices having microphones may be utilized to perform acoustic event detection to detect the sound of the target device door being opened and/or shut, and/or the sound of ice falling into a tray from an ice maker, for example. In other examples, the connected devices may include contact sensors that may be placed on the target device to detect the opening and closing of a door. Other sensor data than that specifically used above by way of example may be utilized as well to detect target device usage.

At block 808, the process 800 may include generating, based at least in part on the second data and the third data, a fourth data indicating a first probability value that the door of the second device will be opened when the predefined user activity is detected. For example, a target device operation model may be configured to receive activity data from the activity model, target device usage data from the usage component, and/or event data from the event component to determine one or more probability values that the target device will be operated and/or a number of times the target device will be operated during certain periods of time. To do so, the target device operation model may be trained to determine that the target device is operated when certain predefined activities are detected and/or when certain events occur. For example, the target device operation model may determine that when a cooking activity is detected, such as for a specific target device situated in a specific space and associated with specific account data, the refrigerator target device is operated on average, for example, 5 times. In this example, the target device operation model may determine that cooking activities, when detected, are associated with a greater amount of target device usage than at other times. Other examples of activities the target device operation model may determine are associated with greater target device usage may include, for example, when at least a threshold number of occupants are detected within a given space, such as within a kitchen space and/or a dining room space, when a given user is detected in the space, when presence is detected in a given space and/or within a given number of spaces, and/or when indicators of user entrance and/or exit from a space is detected. The target device operation model may be configured to utilize machine learning techniques, as described more fully below, to identify activities and/or activity factors that are more likely and/or less likely to be associated with target device usage.

At block 810, the process 800 may include sending, to the second device and in response to detecting the predefined user activity from acoustic events within the space, a first command configured to cause an action associated with a temperature control component of the second device to be performed. For example, a command generator may generate a command configured to cause the functionality to be performed. In examples, the command, when received at the target device, may cause the target device to perform the functionality. Utilizing the refrigerator examples above, the command may be to cause a cooling unit of the refrigerator and/or freezer to enable and/or to cause the ice making component to make ice. In other examples, the command may cause the target device to refrain from performing the functionality and/or to perform the functionality at a later time and/or to disable operation of a component of the target device. For example, the command may cause a cooling component of the target device to stop cooling, to cause a cooling component not to enable for a given period of time when the door is opened, and/or to cause the cooling component to enable after 15 minutes, for example, from when the command is received.

Additionally, or alternatively, the process 800 may include storing account data associating the second device with a profile. The process 800 may also include receiving fifth data indicating that items associated with the second device have been acquired in association with the profile. The process 800 may also include determining that a user associated with the acquisition of the items has arrived at the space. The process 800 may also include sending the command in response to the fifth data and the user arriving at the space.

Additionally, or alternatively, the process 800 may include determining, based at least in part the first data, a portion of the space in which the predefined user activity is detected. The process 800 may also include determining, based at least in part on the first data, a number of users including the user within at least the portion of the space. In these examples, generating the second data indicating that the user is engaged in the predefined user activity may be based at least in part on determining the predefined user activity was detected in the portion of the space and from the number of the users.

Additionally, or alternatively, the process 800 may include storing account data associating the second device with a profile. The process 800 may also include receiving fifth data indicating that a delivery associated with the profile includes an item predefined to be stored in the second device. The process 800 may also include sending, based at least in part on receiving the fifth data, the command to the second device.

Additionally, or alternatively, the process 800 may include receiving audio data representing a sound made within the space and determining that an audio signature associated with the audio data corresponds to a reference audio signature associated with a reference sound made when operating the component of the second device. The process 800 may also include generating the third data based at least in part on the audio signature corresponding to the reference audio signature.

Additionally, or alternatively, the process 800 may include determining, based at least in part on the first data, a number of users within the portion of the space. In these examples, generating the second data may be based at least in part on the number of the users.

Additionally, or alternatively, the process 800 may include determining, for a time period, a first number of times that the action associated with the temperature control component is performed. The process 800 may also include determining, based at least in part on the predefined user activity, a second number of times that the action is to be performed, the second number of times differing from the first number of times. In these examples, the command may be configured to cause the action associated with the temperature control component of the second device to be performed the second number of times.

Additionally, or alternatively, the process 800 may include determining that the predefined user activity is associated with a functionality of multiple functionalities of the second device based at least in part on the functionality being historically performed when the door is opened. The process 800 may also include selecting the functionality from the multiple functionalities, the functionality associated with the action.

Figure 9:
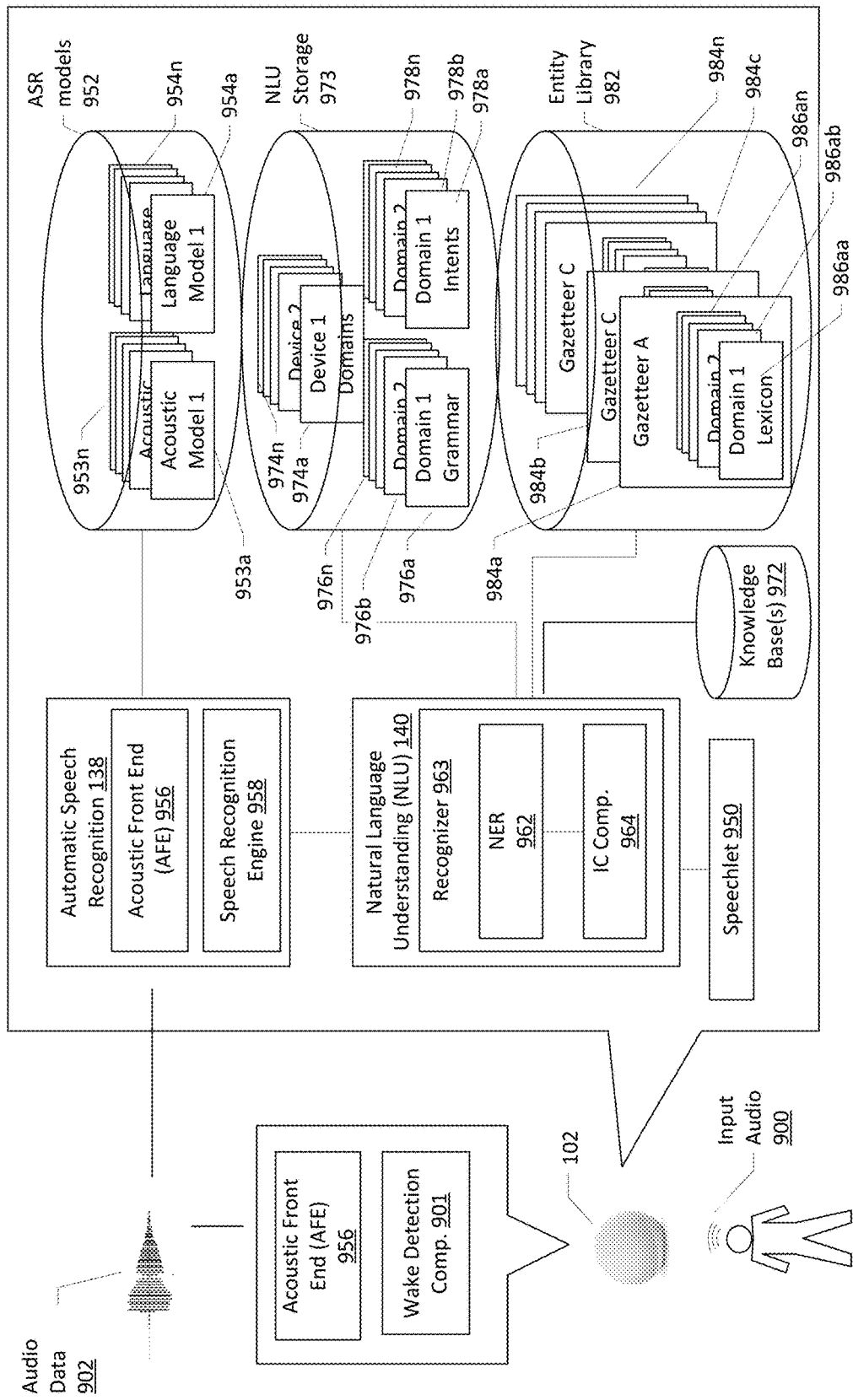
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 108. An audio capture component, such as a microphone 116 of the device 102(*a*)-(*d*), or another device, captures audio 900 corresponding to a spoken utterance. The device 102(*a*)-(*d*), using a wake word engine 901, then processes audio data corresponding to the audio 900 to determine if a keyword (such as a wakeword) is detected in the audio data. Following detection of a wakeword, the device 102(*a*)-(*d*) processes audio data 902 corresponding to the utterance utilizing an ASR component 138. The audio data 902 may be output from an optional acoustic front end (AFE) 956 located on the device prior to transmission. In other instances, the audio data 902 may be in a different form for processing by a remote AFE 956, such as the AFE 956 located with the ASR component 138.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102(*a*)-(*d*) may "wake." The audio data 902 may include data corresponding to the wakeword. Further, a local device may "wake" upon detection of speech/spoken audio above a threshold, as described herein. An ASR component 138 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 138 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, order ice cream and milk?" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "order ice cream and milk."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 140 may include various components, including potentially dedicated processor(s), memory, storage, etc. As shown in FIG. 9, an NLU component 140 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 138 based on the utterance input audio 900) and attempts to make a semantic interpretation of the text. That is, the NLU process determines the meaning behind the text based on the individual words and then implements that meaning. NLU processing 140 interprets a text string to derive an intent or a desired action from the user as well as the pertinent pieces of information in the text that allow a device (e.g., device 102(*a*)-(*d*)) to complete that action. For example, if a spoken utterance is processed using ASR 138 and outputs the text "order ice cream and milk" the NLU process may determine that the user intended to order food, with the food being ice cream and milk.

The NLU 140 may process several textual inputs related to the same utterance. For example, if the ASR 138 outputs N text segments (as part of an N-best list), the NLU may process all N outputs to obtain NLU results.

As will be discussed further below, the NLU process may be configured to parse and tag to annotate text as part of NLU processing. For example, for the text "order ice cream and milk," "order" may be tagged as a command (to purchase items) and "ice cream" and "milk" may be tagged as the naming identifiers of the items to be purchased.

To correctly perform NLU processing of speech input, an NLU process 140 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 140 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 950. The destination speechlet 950 may be determined based on the NLU output. For example, if the NLU output includes a command to send a message, the destination speechlet 950 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 950 may provide some or all of this information to a text-to-speech (TTS) engine. The TTS engine may then generate an actual audio file for outputting the audio data determined by the application (e.g., "okay," or "items ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 140 during runtime operations where NLU operations are performed on text (such as text output from an ASR component 138). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102(a)-(d) may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 106, as illustrated herein are exemplary, and may be located in a stand-alone device or may be included, in whole or in part, as a component of a larger device or system, may be distributed across a network or multiple devices connected by a network, etc.

Figure 10:
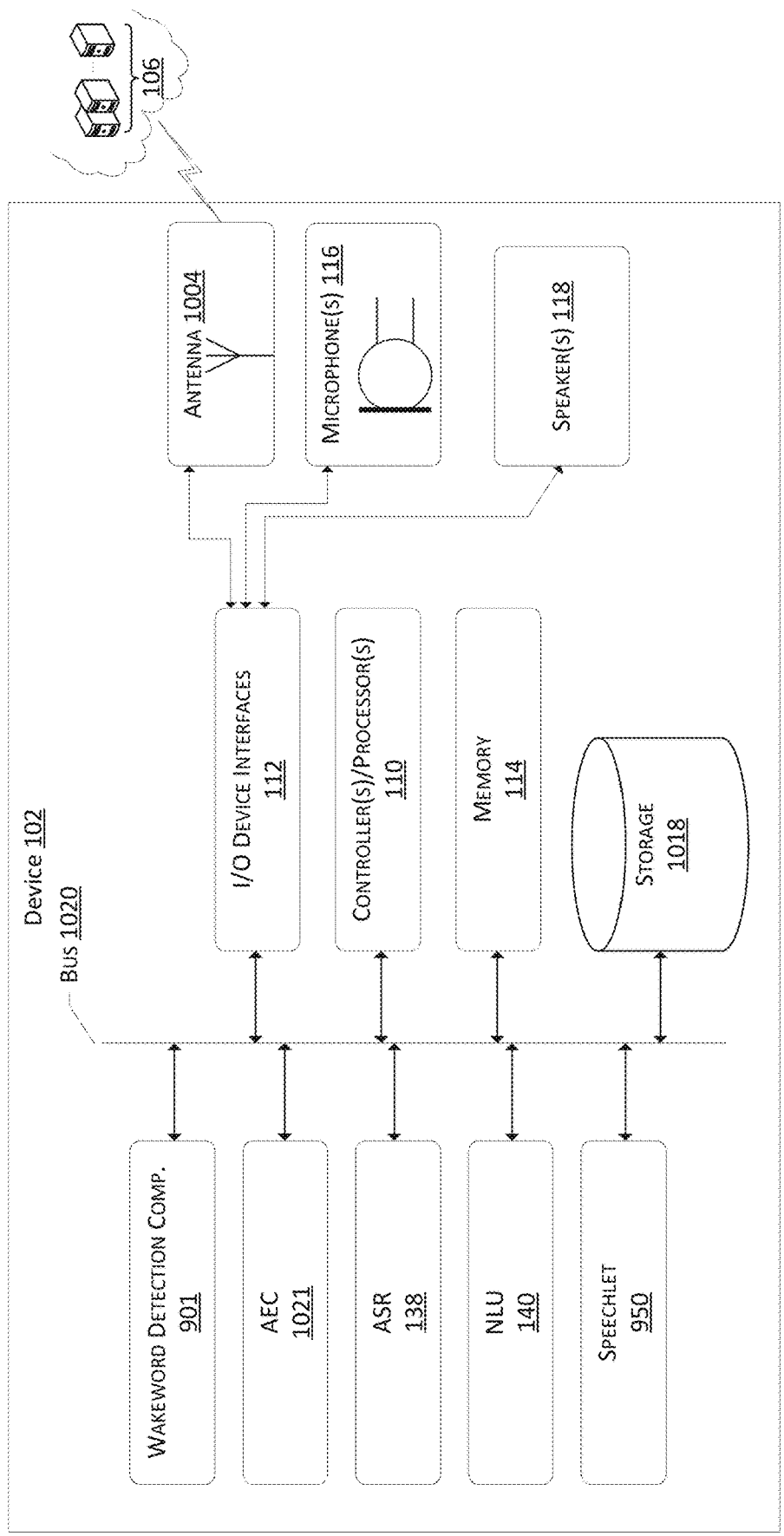
FIG. 10 illustrates a conceptual diagram of components of an example connected device from which sensor data may be received for device functionality control utilizing activity prediction.

FIG. 10 illustrates a conceptual diagram of components of an example connected device from which sensor data may be received for device functionality control utilizing activity prediction. For example, the device may include one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102(a)-(d) may be implemented as a standalone device that is relatively simple in terms of functional capabilities with limited input/output components, memory, and processing capabilities. For instance, the device 102(a)-(d) may not have a keyboard, keypad, touch-screen, or other form of mechanical input. In some instances, the device 102(a)-(d) may include a microphone 116, a power source, and functionality for sending generated audio data via one or more antennas 1004 to another device and/or system.

The device 102(a)-(d) may also be implemented as a more sophisticated computing device, such as a computing device similar to, or the same as, a smart phone or personal digital assistant. The device 102(a)-(d) may include a display with a touch interface and various buttons for providing input as well as additional functionality such as the ability to send and receive communications. Alternative implementations of the device 102(a)-(d) may also include configurations as a personal computer. The personal computer may include input devices such as a keyboard, a mouse, a touchscreen, and other hardware or functionality that is found on a desktop, notebook, netbook, or other personal computing devices. In examples, the device 102(a)-(d) may include an automobile, such as a car. In other examples, the device 102(a)-(d) may include a pin on a user's clothes or a phone on a user's person. In examples, the device 102(a)-(d) and may not include speaker(s) and may utilize speaker(s) of an external or peripheral device to output audio via the speaker(s) of the external/peripheral device. In this example, the device 102(a)-(d) might represent a set-top box (STB), and the device 102(a)-(d) may utilize speaker(s) of another device such as a television that is connected to the STB for output of audio via the external speakers. In other examples, the device 102(a)-(d) may not include the microphone(s) 116, and instead, the device 102(a)-(d) can utilize microphone(s) of an external or peripheral device to capture audio and/or generate audio data. In this example, the device 102(a)-(d) may utilize microphone(s) of a headset that is coupled (wired or wirelessly) to the device 102(a)-(d). These types of devices are provided by way of example and are not intended to be limiting, as the techniques described in this disclosure may be used in essentially any device that has an ability to recognize speech input or other types of natural language input.

The device 102(a)-(d) of FIG. 10 may include one or more controllers/processors 110, that may include a central processing unit (CPU) for processing data and computer-readable instructions, and memory 114 for storing data and instructions of the device 102(a)-(d). In examples, the skills and/or applications described herein may be stored in association with the memory 114, which may be queried for content and/or responses as described herein. The device 102(a)-(d) may also be connected to removable or external non-volatile memory and/or storage, such as a removable memory card, memory key drive, networked storage, etc., through input/output device interfaces 112.

Computer instructions for operating the device 102(a)-(d) and its various components may be executed by the device's controller(s)/processor(s) 110, using the memory 114 as "working" storage at runtime. A device's computer instructions may be stored in a non-transitory manner in non-volatile memory 114, storage 1018, or an external device(s). Alternatively, some or all of the executable instructions may be embedded in hardware or firmware on the device 102(a)-(d) in addition to or instead of software.

The device 102(a)-(d) may include input/output device interfaces 112. A variety of components may be connected through the input/output device interfaces 112. Additionally, the device 102(a)-(d) may include an address/data bus 1020 for conveying data among components of the respective device. Each component within a device 102(a)-(d) may also be directly connected to other components in addition to, or instead of, being connected to other components across the bus 1020.

The device 102(a)-(d) may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display. As a way of indicating to a user that a connection between another device has been opened, the device 102(a)-(d) may be configured with one or more visual indicators, such as the light element(s), which may be in the form of LED(s) or similar components (not illustrated), that may change color, flash, or otherwise provide visible light output, such as for a notification indicator on the device 102(a)-(d). The input/output device interfaces 112 that connect to a variety of components. This wired or a wireless audio and/or video port may allow for input/output of audio/video to/from the device 102(a)-(d). The device 102(a)-(d) may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102(a)-(d) (using microphone 116, wakeword detection component 1001, ASR component 138, etc.) may be configured to generate audio data corresponding to captured audio. The device 102(a)-(d) (using input/output device interfaces 112, antenna 1004, etc.) may also be configured to transmit the audio data to the remote system 106 for further processing or to process the data using internal components such as a wakeword detection component 901.

Via the antenna(s) 1004, the input/output device interface 112 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102(a)-(d) via wired connection to an external alternating current (AC) outlet, and/or via onboard power sources, such as batteries, solar panels, etc.

Through the network(s), the system may be distributed across a networked environment. Accordingly, the device 102(a)-(d) and/or the remote system 106 may include an ASR component 138. The ASR component 138 of device 102(a)-(d) may be of limited or extended capabilities. The ASR component 138 may include language models stored in ASR model storage component, and an ASR component 138 that performs automatic speech recognition. If limited speech recognition is included, the ASR component 138 may be configured to identify a limited number of words, such as keywords detected by the device, whereas extended speech recognition may be configured to recognize a much larger range of words.

The device 102(a)-(d) and/or the remote system 106 may include a limited or extended NLU component 140. The NLU component 140 of device 102(a)-(d) may be of limited or extended capabilities. The NLU component 140 may comprise a name entity recognition module, an intent classification module and/or other components. The NLU component 140 may also include a stored knowledge base and/or entity library, or those storages may be separately located.

In examples, AEC may also be performed by the device 102(a)-(d). In these examples, the operations may include causing the AEC component 1021 to be enabled or otherwise turned on, or the operations may include causing the AEC component 1021 to transition from a first mode to a second mode representing a higher sensitivity to audio data generated by the microphone 116. The AEC component 1021 may utilize the audio data generated by the microphone 116 to determine if an audio fingerprint of the audio data, or portion thereof, corresponds to a reference audio fingerprint associated with the predefined event.

The device 102(a)-(d) and/or the remote system 106 may also include a speechlet 950 that is configured to execute commands/functions associated with a spoken command as described herein. The device 102(a)-(d) may include a wakeword detection component 901, which may be a separate component or may be included in an ASR component 138. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102(a)-(d) may be configured collectively to identify a set of the directional audio signals in which the wake expression is detected or in which the wake expression is likely to have occurred.

Figure 11:
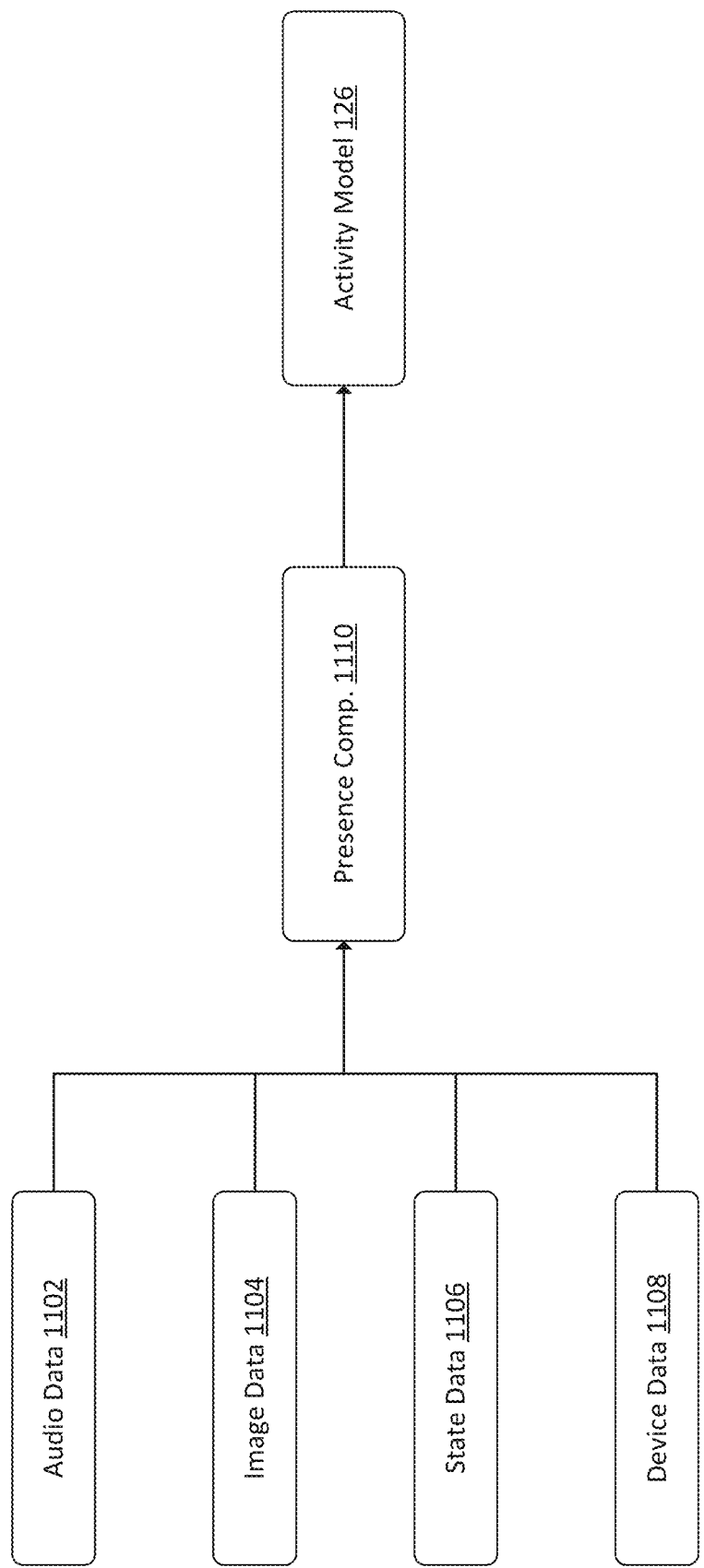
FIG. 11 illustrates a conceptual diagram of example presence detection utilized for device functionality control utilizing activity prediction.

FIG. 11 illustrates a conceptual diagram of example presence detection utilized for device functionality control. FIG. 11 depicts example data types that may be utilized by a presence component 1110 to detect the presence of a user in an environment.

Example data types for detecting presence may include audio data 1102, image data 1104, state data 1106, and/or device data 1108. The audio data 1102 may be received from a microphone associated with an environment where a given device is situated. The audio data 1102 may be analyzed by the presence component 1110 to determine whether the audio data 1102 indicates the presence of user speech, footsteps, use of devices in the environment, and/or the presence of other noises that are indicative of a user being present. To do so, the presence component 1110 may compare the audio data 1102 to reference audio data to detect the presence of such noises. In examples where user speech is to be detected, ASR data may be utilized and/or detection of a wake word may be utilized.

When image data 1104 is described herein as being analyzed, that analysis may include the use of computer vision to identify objects depicted in the image data 1104. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

When state data 1106 is utilized, the state data 1106 may indicate when and how device states have changed for devices in the environment. For example, when a smart light is turned on, an indication of the change of state from off to on may be stored. The state itself, or the timing of the state change may indicate that a user is present in the environment and/or that the user is likely present.

When device data 1108 is utilized, the device data 1108 may indicate the presence of a personal device associated with a user, such as a mobile phone and/or a wearable device. These devices may send out beacons that are received at a given primary device, indicating that the devices are proximate to the primary device and also indicating that the user associated with such devices are present.

The data associated with the presence event may be any data that may be utilized by the activity model 126 to determine a predefined activity, if any, that is occurring in association with an environment in which a target device is situated.

For example, sensor data may be received from the one or more connected devices in an environment associated with the target device. The one or more connected devices may be Internet-of-Things (IoT) devices that may generate data indicating one or more attributes of the environment. For example, the connected devices may include a device having a microphone configured to capture audio representing sounds made within the environment and to generate corresponding audio data that may be analyzed as described herein. The connected devices may also include a device having a camera and/or motion sensor. The device having the camera may be configured to capture images of the environment and generate corresponding image data that may be analyzed as described herein. The device having the motion sensor may be configured to detect motion within a field of view of the device and to generate indications that motion has been detected. The connected devices may also include devices such as door locks, which may be configured to generate indications of when the door lock is engaged, or otherwise locked, and when the door lock is disengaged, or otherwise unlocked. The connected devices may also include devices having an audio-output component, such as a speaker, that may be configured to output audio into the environment. The connected devices may also include other devices that may be controlled utilizing, for example voice input and/or other user input such as user input received via a user interface. These connected devices may be, for example and not by way of limitation, lights, switches, plugs, vehicles, televisions, thermostats, doorbells, appliances, window treatments, security systems, etc. The connected devices may also include personal devices, such as cellphones, tablets, personal computers, etc., which may be configured to communicate with other devices within the environment when the personal devices are brought into the environment. Some or all of these devices may generate sensor data associated with the connected devices.

An activity model may be configured to receive the sensor data and to utilize the sensor data to determine one or more activities that users within the environment are engaged in. These activities may include whether users are present or not present in the environment. Additional details on presence detection are provided below. These activities may also include specific activities that a user is engaged in. For example, the activity model may be configured to utilize the sensor data to determine that a user is engaged in a cooking activity and/or an eating activity. Additional activities may include social gatherings, entry and/or exit from a given space within the environment, washing dishes, watching television, etc. The activities may also indicate specific users that are present within a given space, a number of occupants within a given space, and/or other indicators about users associated with the environment. To determine that a certain predefined activity is being performed, the activity model may be trained to determine that the predefined activity is being performed when certain sensor data is received. For example, the predefined activity of users being away from the environment may be based on an absence of sensor data indicating sounds associated with movement within the environment, the opening and closing of a garage door and/or an exterior door to the environment, an absence of sensor data indicating images associated with movement within the environment, an absence of device state changes, etc. By way of continued example, the predefined activity of a user being present within the environment may be based on motion detection within the environment, sensor data indicating sounds associated with movement within the environment, signals received from a personal device associated with a user, etc. Furthermore, with respect to given specific activities such as cooking, acoustic event detection techniques, as described more fully below, may be utilized to detect sounds that have been predefined to correspond to cooking, such as the filling of a pot with water, the sizzle sound made from frying, the turning on of an oven, chopping sounds, etc. Predefined activities such as cooking may also be determined from a prolonged presence detection of a user in a space indicated as a kitchen, for example. It should be understood that some or all of the sensor data described herein may be utilized to determine when a predefined activity is taking place within an environment, and the predefined activities may include those specifically used as examples herein and/or any other predefined activity that the activity model is trained to detect.

Figure 12:
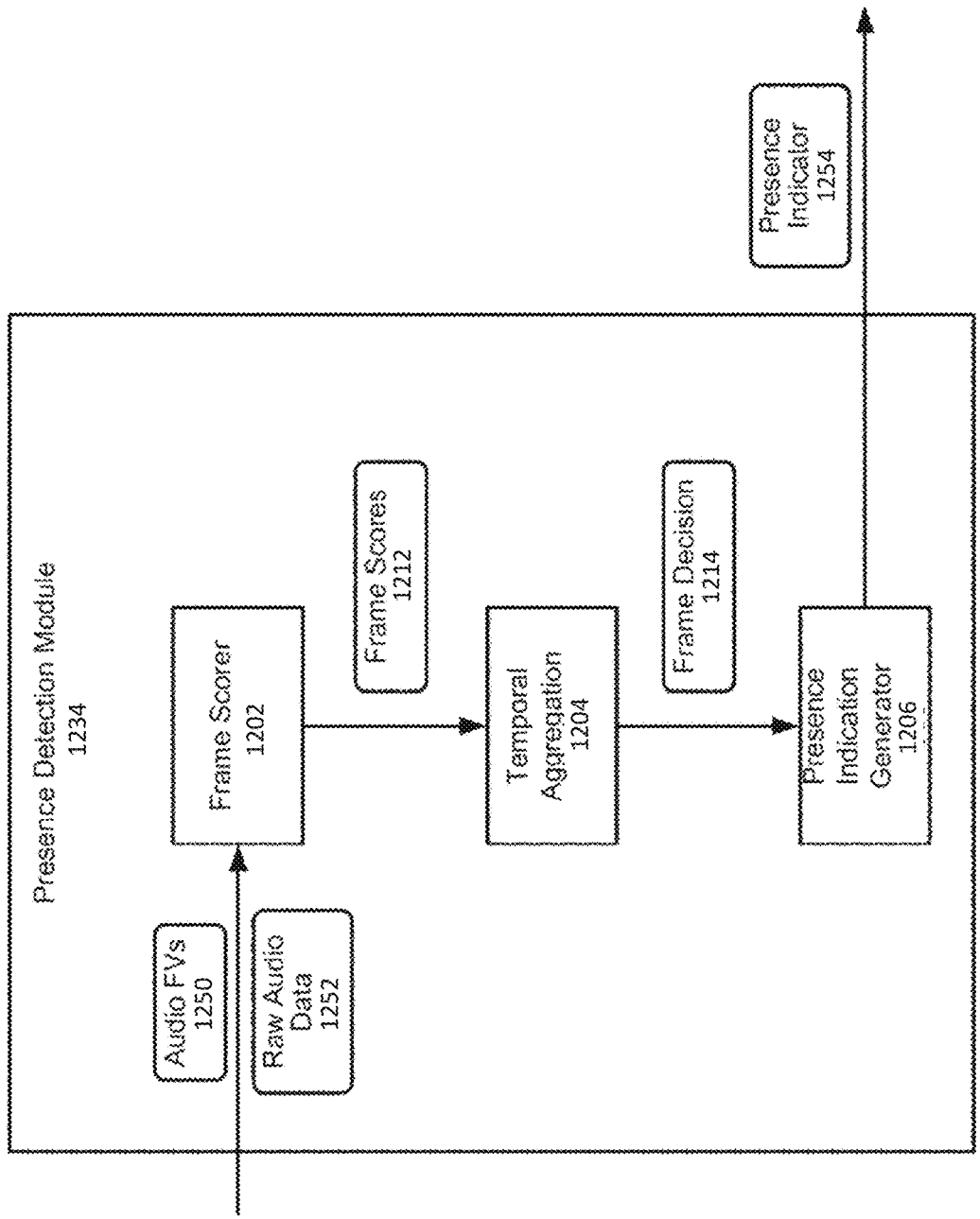
FIG. 12 illustrates processing of data related to presence detection by a device according to embodiments of the present disclosure.

FIG. 12 illustrates processing of data related to presence detection by a device according to embodiments of the present disclosure. In particular, a presence detection module 1234 may use one or more models to analyze audio data to determine if a user is present and/or an activity being performed by a user. As shown in FIG. 12, the presence detection module 1234 may include a number of components to process and analyze the audio data. Audio data, such as feature vectors 1250, and/or raw audio data 1252 may be input into a frame scorer 1202 which may operate a trained model using machine learning techniques (such as a DNN sound classifier) to score particular audio data as likely corresponding to human presence or not. For example, the frame scorer 1202 may process a feature vector 1250 representing a frame's worth of audio data and create a score 1212 representing a probability that the frame corresponds to user presence and/or a probability that the frame corresponds to a user performing a particular activity. The score 1212 may be a binary indicator (for example, 0 for no human/activity detected, 1 for human/activity detected) or may be a different value indicating a probability or likelihood of human/activity presence. The scores may be passed to a temporal aggregation machine learning techniques to determine whether an incoming frame level score is sufficient to decide whether the frame should be classified as human/activity detected YES or human/activity detected NO, represented by frame decision 1214. In making a decision for a particular frame, the temporal aggregation component 1204 may consider the score 1212 from the individual frame as well as potentially scores from other frames (e.g., a certain number of frames coming before or after) as well as reference frame-level scores to align the output of the temporal aggregation component 1204.

The temporal aggregation component 1204 may operate an HMM to alternate states between human/activity detected YES and human/activity detected NO. One example of such operation is a state machine approach. State S=O may correspond to no human/activity presence detected while state S=1 corresponds to human/activity presence detected. The probability of staying at state 0 is indicated as $P_{0\ to\ 0}$. The device will stay at state 0 (for example when going from frame t to frame t+1) as represented by $S_{t+1}=P_t^*(1-a)+f_t^*a$ where $f_t$ is the frame level score 1212 for frame t, a is a configurable attack rate (e.g., a factor representing how quickly the system should transition from no presence detected to presence detected), and $P_t$ represents a weighted sum/cumulated version of $f_t$. $P_t$ may be set to an initial value (e.g., 1) and then may decay based on the formula for $P_{t+1}$ shown below. The device will stay at state 0 if $P_t^*(1-a)+f_t^*a<T_{0\ to\ 1}$ where $T_{0\ to\ 1}$ represents a configurable score threshold for transitioning from state 0 to state 1. Otherwise, the device will transition from state 0 to state 1 (e.g., $P_{t+1}=1$, shown as $P_{0\ to\ 1}$) if $P_t^*(1-a)+f_t^*a\ T_{0\ to\ 1}$.

The device may stay at state 1 (shown as $P_{1\ to\ 1}$) as represented by $P_{t+1}=P_t^*r\ f_t^*(1-r)$ where r is a configurable release rate (e.g., a factor representing how quickly the system should transition from presence detected to no presence detected). The device will stay at state 1 if $P_t^*r+f_t^*(1-r)>T_{1\ to\ 0}$ where $T_{1\ to\ 0}$ represents a configurable score threshold for transitioning from state 1 to state 0. Otherwise the device will transition from state 1 to state 0 (e.g., $P_{t+1}=0$, shown as $P_{1\ to\ 0}$) if $P_t^*r+f_t^*(1-r)\leq T_{1\ to\ 0}$. Thresholds $T_{0\ to\ 1}$ and $T_{1\ to\ 0}$ and may be different, or may be the same.

While the decision 1214 is described as a frame decision, a decision may be made on groups of frames rather than (or in addition to) individual frames. Certain frames may be grouped and analyzed to decide whether the frames correspond to human presence being detected. Further, a classifier may be used to determine a presence decision for a frame or group of frames.

The temporal aggregation component 1204 may apply certain smoothing to avoid rapid changes in the frame decision 1214 (e.g., rapid state transitions). Such smoothing may account for natural pauses or breaks in audio that may not necessarily indicate a change in whether a human is present. For example, if the system detects washing dishes, then detects a momentary silence, then detects washing dishes again, the frames during the silence may correspond to scores 1212 corresponding to no presence detected even if the human who was washing is still in the vicinity of the device. To account for such audio fluctuations the temporal aggregation component 1204 may wait to change a state (e.g., a frame decision 1214) until a certain minimum number of frames are seen that have scores on the same side of the threshold. This minimum may be configured and may be different depending on which side of which threshold the frames appear.

As shown in FIG. 12, frame decisions 1214 may be passed to a presence indication generator 1206. The presence indication generator 1206 generates a periodic presence indicator 1254 which indicates the presence status at a particular point in time. The presence indication generator 1206 may generate a presence indicator 1254 according to a periodic schedule, for example every 5 seconds, 10 seconds, or the like. The presence indicator 1254 may be a representation of the frame decision taken at a particular moment in time. For example, if at time t, the frame decision is 1, the presence indicator 1254 corresponding to time t will be 1. Similarly, if at time t+30 seconds the frame decision is 1, the presence indicator 1254 for time t+30 will be 1, even if the frame decision for frames t+1 through t+29 were all 0. Alternatively, the presence indicator 1254 may be an average binary representation of the majority of frame decisions taken over a period of time. In the above example, the frame decision at t may be 1, but then if the frame decision for frames t+1 through t+29 were all 0, the frame decision for time t+30 will also be 0, even if the frame decision for time t+30 is 1. The presence indicator may also be calculated in other manners.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
   receiving, from first devices and during a period of time, first data indicating sounds made in a space in which the first devices are disposed, the first devices being associated with a second device configured to refrigerate items within the second device;
   generating, utilizing the first data, second data indicating that the sounds are associated with a predefined user activity within the space, the predefined user activity being predefined to be associated with use of the second device;
   receiving, from the second device and during the period of time, third data indicating that a door of the second device is opened;
   generating, utilizing the second data and the third data, fourth data indicating a first probability value that the door of the second device will be opened when the predefined user activity is detected; and
   sending, to the second device and in response to detecting the predefined user activity from acoustic events within the space, a first command configured to cause a temperature control component of the second device to delay cooling within the second device.

2. The system of claim 1, the operations further comprising:
   storing account data associating the second device with a profile utilized to acquire items associated with the second device;
   receiving fifth data indicating that at least a portion of the items have been acquired;
   determining, from sixth data received from at least one of the first devices, that a user associated with the acquisition of the items has arrived at the space; and
   sending the command in response to the fifth data indicating the at least the portion of the items have been acquired and that the user has arrived at the space.

3. The system of claim 1, the operations further comprising:
   determining, utilizing the first data, a portion of the space in which the predefined user activity is detected, the portion of the space associated with the second device;
   determining, utilizing the first data, a number of users including the user within at least the portion of the space; and
   wherein generating the second data indicating that the user is engaged in the predefined user activity is from determining the predefined activity was detected in the portion of the space and from the number of the users.

4. The system of claim 1, the operations further comprising:
   storing account data associating the second device with a profile utilized to acquire items associated with the second device;
   receiving fifth data indicating that a delivery associated with the profile includes an item predefined to be stored in the second device; and
   sending, in response to receiving the fifth data, the command to the second device.

5. A method, comprising:
   receiving, from a first device and during a period of time, first data representing sounds made in a space in which the first device is disposed;
   generating, based at least in part on the first data, second data indicating that the sounds are associated with a predefined user activity within the space;
   receiving, from a second device and during the period of time, third data indicating that a door of the second device is opened;
   generating, based at least in part on the second data and the third data, fourth data indicating a first probability value that the door of the second device will be opened when the predefined user activity is detected; and
   sending, to the second device and in response to detecting the predefined user activity from acoustic events within the space, a first command configured to cause an action associated with a temperature control component of the second device to be performed.

6. The method of claim 5, further comprising:
   storing account data associating the second device with a profile;
   receiving fifth data indicating that items associated with the second device have been acquired in association with the profile;

determining that a user associated with the acquisition of the items has arrived at the space; and sending the command in response to the fifth data and the user arriving at the space.

7. The method of claim 5, further comprising:

determining, based at least in part the first data, a portion of the space in which the predefined user activity is detected;

determining, based at least in part on the first data, a number of users including the user within at least the portion of the space; and wherein generating the second data indicating that the user is engaged in the predefined user activity is based at least in part on determining the predefined user activity was detected in the portion of the space and from the number of the users.

8. The method of claim 5, further comprising:

storing account data associating the second device with a profile;

receiving fifth data indicating that a delivery associated with the profile includes an item predefined to be stored in the second device; and sending, based at least in part on receiving the fifth data, the command to the second device.

9. The method of claim 5, further comprising:

receiving audio data representing a sound made within the space;

determining that an audio signature associated with the audio data corresponds to a reference audio signature associated with a reference sound made when operating the component of the second device; and generating the third data based at least in part on the audio signature corresponding to the reference audio signature.

10. The method of claim 5, further comprising:

determining, based at least in part on the first data, a number of users within the portion of the space; and wherein generating the second data comprises generating the second data based at least in part on the number of the users.

11. The method of claim 5, further comprising:

determining, for a time period, a first number of times that the action associated with the temperature control component is performed;

determining, based at least in part on the predefined user activity, a second number of times that the action is to be performed, the second number of times differing from the first number of times; and wherein the command is configured to cause the action associated with the temperature control component of the second device to be performed the second number of times.

12. The method of claim 5, further comprising:

determining that the predefined user activity is associated with a functionality of multiple functionalities of the second device based at least in part on the functionality being historically performed when the door is opened; and selecting the functionality from the multiple functionalities, the functionality associated with the action.

13. A system, comprising:

one or more processors; and non-transitory computer-readable media storing computer-executable instructions that, when executed by the one or more processors, cause the one or more processors to perform operations comprising:

receiving, from a first device and during a period of time, first data representing sounds made in a space in which the first device is disposed;

generating, based at least in part on the first data, second data indicating that the sounds are associated with a predefined user activity within the space;

receiving, from a second device and during the period of time, third data indicating that a door of the second device is opened;

generating, based at least in part on the second data and the third data, fourth data indicating a first probability value that the door of the second device will be opened when the predefined user activity is detected; and sending, to the second device and in response to detecting the predefined user activity from acoustic events within the space, a first command configured to cause an action associated with a temperature control component of the second device to be performed.

14. The system of claim 13, the operations further comprising:

storing account data associating the second device with a profile;

receiving fifth data indicating that items associated with the second device have been acquired in association with the profile;

determining that a user associated with the acquisition of the items has arrived at the space; and sending the command in response to the fifth data and the user arriving at the space.

15. The system of claim 13, the operations further comprising:

determining, based at least in part the first data, a portion of the space in which the predefined user activity is detected;

determining, based at least in part on the first data, a number of users including the user within at least the portion of the space; and wherein generating the second data indicating that the user is engaged in the predefined user activity is based at least in part on determining the predefined user activity was detected in the portion of the space and from the number of the users.

16. The system of claim 13, the operations further comprising:

storing account data associating the second device with a profile;

receiving fifth data indicating that a delivery associated with the profile includes an item predefined to be stored in the second device; and sending, based at least in part on receiving the fifth data, the command to the second device.

17. The system of claim 13, the operations further comprising:

receiving audio data representing a sound made within the space;

determining that an audio signature associated with the audio data corresponds to a reference audio signature associated with a reference sound made when operating the component of the second device; and generating the third data based at least in part on the audio signature corresponding to the reference audio signature.

18. The system of claim 13, the operations further comprising:
- determining, based at least in part on the first data, a number of users within the portion of the space; and
- wherein generating the second data comprises generating the second data based at least in part on the number of the users.

19. The system of claim 13, the operations further comprising:
- determining, for a time period, a first number of times that the action associated with the temperature control component is performed;
- determining, based at least in part on the predefined user activity, a second number of times that the action is to be performed, the second number of times differing from the first number of times; and
- wherein the command is configured to cause the action associated with the temperature control component of the second device to be performed the second number of times.

20. The system of claim 13, the operations further comprising:
- determining that the predefined user activity is associated with a functionality of multiple functionalities of the second device based at least in part on the functionality being historically performed when the door is opened; and
- selecting the functionality from the multiple functionalities, the functionality associated with the action.

\* \* \* \* \*